United States Patent [19]
Ungerboeck

(10) Patent No.: US 7,616,701 B2
(45) Date of Patent: Nov. 10, 2009

(54) ZERO EXCESS BANDWIDTH MODULATION

(75) Inventor: Gottfried Ungerboeck, Langnau (CH)

(73) Assignee: Broadcom Corporation, Irvine, CA (US)

( * ) Notice: Subject to any disclaimer, the term of this patent is extended or adjusted under 35 U.S.C. 154(b) by 713 days.

(21) Appl. No.: 10/779,825

(22) Filed: Feb. 17, 2004

(65) Prior Publication Data

US 2004/0174937 A1 Sep. 9, 2004

Related U.S. Application Data

(60) Provisional application No. 60/453,051, filed on Mar. 8, 2003.

(51) Int. Cl.
*H04L 27/00* (2006.01)
(52) U.S. Cl. .................. 375/295; 375/298; 375/265; 375/262; 375/242; 375/246
(58) Field of Classification Search .......... 370/210, 370/485, 486; 375/260, 261, 279, 308, 268, 375/295, 298, 265, 262, 242, 246
See application file for complete search history.

(56) References Cited

U.S. PATENT DOCUMENTS

| | | | | |
|---|---|---|---|---|
| 6,005,897 A * | 12/1999 | McCallister et al. | ......... | 375/340 |
| 6,741,551 B1 * | 5/2004 | Cherubini | .................. | 370/210 |
| 6,999,446 B2 * | 2/2006 | Hall et al. | .................. | 370/349 |
| 7,058,147 B2 * | 6/2006 | Erving et al. | ............... | 375/348 |
| 7,123,663 B2 * | 10/2006 | De Gaudenzi et al. | ...... | 375/279 |
| 2004/0243914 A1 * | 12/2004 | Noda | ........................ | 714/792 |

FOREIGN PATENT DOCUMENTS

| | | |
|---|---|---|
| EP | 0 397 535 A2 | 5/1990 |
| EP | 1 021 012 A1 | 11/1999 |

OTHER PUBLICATIONS

Giovanni Cherubini, Evangelos Eleftheriou and Sedat Olcer, Filtered Multitone Modulation for Very High-Speed Digital Subscriber Lines, IEEE Journal On Selected Areas in Communications, vol. 20, No. 5, Jun. 2002, pp. 1016-1028.

* cited by examiner

*Primary Examiner*—Shuwang Liu
*Assistant Examiner*—Kabir A Timory
(74) *Attorney, Agent, or Firm*—Garlick Harrison & Markison; Shayne X. Short

(57) ABSTRACT

ZEB (zero excess bandwidth) modulation. The modulation rate of a signal is increased to the entirety of a communication channel's available bandwidth. Spectral zeroes at the edges of the available bandwidth now coincide with spectral zeroes at the edges of the Nyquist band and lead to ISI (intersymbol interference), which cannot be eliminated by equalization. Thus, in a ZEB system intersymbol interference (ISI) is intentionally allowed and dealt with by the known technique of TH (Tomlinson-Harashima) precoding. Comparison of conventional zero-ISI systems with ZEB systems, both exhibiting identical transmit spectra with finite spectral roll offs towards the edges of the available bandwidth, illustrate significant gains in channel throughput achievable by the ZEB systems. Similar gains can hardly be achieved by more sophisticated channel coding for zero-ISI systems. For ZEB systems an effective spectral shaping involving a simple infinite impulse response (IIR) of the overall channel is proposed.

28 Claims, 13 Drawing Sheets

ZEB modulation communication transmitter including various forms of encoding and symbol mapping and TH precoding Modulation rate (1/T) across a communication channel of bandwidth (W)

Modulation rate (1/T) across multiple bands of a communication channel of bandwidth (nW)

Complex baseband model of zero inter symbol interference (ISI) baseline system

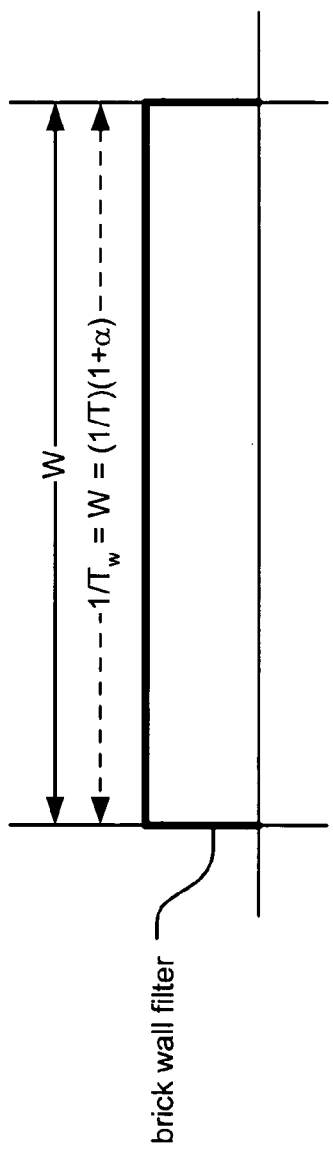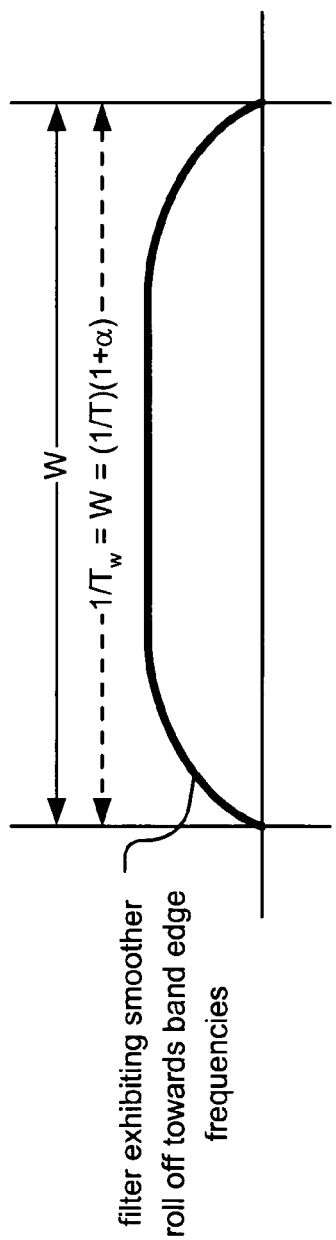

ZEB (zero excess bandwidth) modulation rate ($1/T_w$) across a communication channel of bandwidth (W)

ZEB modulation rate ($1/T_w$) across multiple bands of a communication channel with bandwidth (nW)

Complex baseband model of ZEB system with IIR (infinite impulse response) symbol response and employing TH (Tomlinson-Harashima) precoding Squared magnitude of IIR response Complex baseband model of ZEB modulation communication system ZEB modulation communication transmitter including various forms of encoding and symbol mapping and TH precoding Fig. 12 ZEB modulation transmit method ZEB modulation receive method

ZERO EXCESS BANDWIDTH MODULATION

CROSS REFERENCE TO RELATED PATENTS/PATENT APPLICATIONS

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/453,051, entitled "Zero excess bandwidth modulation,", filed Mar. 8, 2003 (Mar. 8, 2003), pending.

BACKGROUND OF THE INVENTION

1. Technical Field of the Invention

The invention relates generally to communication systems; and, more particularly, it relates to modulation of signals that are transmitted within such communication systems.

2. Description of Related Art

Data communication systems have been under continual development for many years. A design imperative, particularly in the more recent days of broadband communications, is to maximize the amount of data (or information) that can reliably be communicated within a given period of time over a communication channel between a first point and a second point, e.g., the locations of a communication transmitter and a communication receiver.

It is well known since Shannon's original work in the late 1940's and subsequent interpretations that the maximal data rate supported by a communication channel increases linearly with the channel bandwidth and logarithmically with the SNR (signal-to-noise ratio) of the received signals. More precisely, the supported data rate depends linearly on the modulation rate, which is limited by the available channel bandwidth. Further, the supported data rate depends logarithmically on the SNR reduced by the so-called "SNR gap to capacity," which depends on the sophistication of information encoding into signal waveforms at communication transmitters and decoding approaches employed in communication receivers.

A very significant portion of communication research has been devoted to reducing the SNR gap to capacity. For uncoded modulation, the gap to capacity is about 9 dB at moderately low error rate. Hence, due to the lack of sophisticated coding, for reliable information transmission the SNR must be 9 dB (decibels) higher than needed in an ideal system with capacity achieving modulation and coding in the sense of Shannon's theory. During the past two decades, this gap has been reduced to about 3 dB to 5 dB by the introduction of coded modulation, e.g., trellis coded modulation, and the extensive use of FEC (forward error correction) coding, e.g., Reed Solomon coding. More recently, "capacity approaching" coding techniques like turbo coding and decoding provide the possibility of reducing the SNR gap to capacity to less than 1.5 dB.

In comparison to work in coding research, efforts to achieve the highest possible modulation rate within given channel bandwidth have been of a more technical nature. As the modulation rate is increased towards the bandwidth of the communication channel, undesired ISI (inter-symbol interference) among serially transmitted modulation symbols is becoming harder to avoid. Similarly, suppression of interference from adjacent channels (ACI=adjacent channel interference) becomes more difficult.

Many of the presently deployed communication systems are based on the concept of zero-ISI transmission. In these systems, the modulation rate is $1/T=W/(1+\alpha)$, where W is the channel bandwidth and $\alpha>0$ is the fraction of "excess bandwidth" sacrificed to allow for smooth roll-offs of filter transfer functions towards zero outside of the transmission band. The quantity $\alpha$ is therefore also referred to as "spectral roll-off factor." Typical values of $\alpha$ are in the range of 0.1 to 0.3. For given target values of ISI and ACI suppression, the complexity of transmit and receive filter increases with decreasing value of $\alpha$. A chosen value of $\alpha$ reflects a compromise between filter complexity and efficient use of the available bandwidth.

FIG. 1 illustrates a prior art communication system operating at a modulation rate of $1/T=W/(1+\alpha)$, across a communication channel of bandwidth W. In order to achieve zero ISI, the spectrum of the received signal must satisfy a condition known as the Nyquist criterion. Let H(f) be the Fourier transform of the received waveform in response to sending a single modulation symbol at time zero. This symbol response is considered at the output of the overall channel comprising transmit filter(s), communication channel, and receive filter(s). With constant delays ignored, the Nyquist criterion requires that H(f) and shifted versions of H(f) add up to a constant value, e.g., $$\sum_{k=-\infty}^{\infty} H\left(f - \frac{k}{T}\right) = \text{constant.}$$

To satisfy the criterion, H(f) must roll off in the symmetric fashion indicated in FIG. 1 around the edges of the 1/T band, which is called the Nyquist band. If the factor $\alpha$ were reduced to zero, such that 1/T=W, the spectral symbol response H(f) would have to assume rectangular shape. The required "brick wall" filtering cannot be realized with finite filter complexity.

In communication systems that operate using multiple bands, suppressing interference from signals transmitted in adjacent bands, in addition to suppressing out-of-band noise, is of major concern. FIG. 2 depicts the partitioning of a total bandwidth nW into n subbands of bandwidth W. Each subband is used for zero-ISI transmission at modulation rate 1/T.

FIG. 3 illustrates a prior art, complex baseband model of a zero-ISI baseline system with SQRC (square root raised-cosine) transmit and receive filters. An ideal communication channel with flat transfer function $G_C(f)=1$ and constant PSD (power spectral density) $N(f)=N_0$ (AWGN=additive white Gaussian noise) within the transmission band of the channel is assumed. The transfer functions of the transmit filter, $H_T(f)$, and the receive filter, $G_R(f)$, are given by $H_T(f)=G_R(f)=\sqrt{H(f)}$, where H(f) is the spectral RC (raised cosine) symbol response $$H(f) = T \begin{cases} 1, & |f| \leq \frac{1-\alpha}{2T}, \\ \cos^2\left(\frac{\pi T}{2\alpha}\left(|f| - \frac{1-\alpha}{2T}\right)\right), & \frac{1-\alpha}{2T} \leq |f| \leq \frac{1+\alpha}{2T} \\ 0, & \text{otherwise} \end{cases} \quad \text{EQ. (1)}$$

of the overall channel. One can easily verify that H(f) satisfies the Nyquist criterion, and $\int |H_T(f)|^2 df = \int |G_R(f)|^2 df = \int H(f) df = 1$.

In this system, complex-valued modulation symbols $a_n$ are transmitted at a modulation rate of $1/T=W/(1+\alpha)$. The modulation symbols are independently and identically distributed (i.i.d.) random variables with zero mean and average energy $E_a = E\{|a_n|^2\}$). Sampling the output signal of the receive filter at times nT yields the ISI-free sequence of sample values $y_n = a_n + w_n$. The noise samples $w_n$ are complex-valued i.i.d. random variables with zero mean and variance $\sigma_w^2 = E\{|w_n|^2\} = N_0$. The signal-to-noise ratio becomes $SNR = E_a/N_0$. The baseline system then supports a data rate R of $$R = \frac{1}{T} \log_2\left(1 + \frac{SNR}{G}\right) \text{ bit/sec.} \qquad \text{EQ. (2)}$$

In EQ. (2), G denotes the SNR gap from capacity. The value of G provides an abstract characterization of the effectiveness of particular types of modulation and coding schemes, with G=1 being the theoretical optimum. Assume real systems operating at BER (bit-error rate) of $10^{-6}$. Then, for uncoded modulation $G \approx 8$ (9 dB). Systems with currently widely employed modulation and coding are characterized by $G \approx 4$ to 2 (6 to 3 dB). With capacity approaching coding the SNR gap may eventually be reduced 1.5 dB or less.

Sequences of T-spaced quantities $\zeta_n$ can be written in polynomial sequence notation as $\zeta(D) = \Sigma_n \zeta_n D^n$. The delay operator D may be expressed in the frequency domain by $D = e^{-j2\pi fT}$ ($= z^{-1}$). Using this notation, the sequence of modulation symbols becomes a(D) and the sequence of received sample values can generally be written as $$y(D) = h(D)a(D) + w(D), \qquad \text{EQ. (3)}$$

where h(D) represents the symbol response. In the case of a zero-ISI system, h(D)=1 such that y(D)=a(D)+w(D).

In light of the above discussion, attempting to increase the modulation rate by reducing the amount of excess bandwidth inherently increases filter complexity as filters must approach a brick-wall characteristic to maintain zero ISI. Clearly, the realization of filters exhibiting such brick-wall characteristics may not be pursued. Therefore, there exists a need in the art to provide a solution that could enable the use of a modulation rate 1/T=W in a real communication system without necessitating the prohibiting operational constraint described above that requires zero-ISI transmission.

BRIEF SUMMARY OF THE INVENTION

The invention described herein may be referred to as decisively reducing excess bandwidth to zero, i.e., using "zero excess bandwidth" (ZEB) modulation with a modulation of rate $1/T_W = W$, in order to achieve higher channel throughput.

Transmit and receive filters within actual communication systems are realized with smooth spectral roll offs towards zero at the limits of the permitted transmission band. These edges now coincide with the edges of the Nyquist band. Thus, the system can no longer be a zero-ISI system. There are several techniques known in the art to deal with ISI. The method of DFE (decision feedback equalization) has been known for many years. One problem associated with DFE is error propagation caused by the use of incorrect decisions in making subsequent decisions. This problem becomes exacerbated with coded modulation. Because with coded modulation reliable decisions can only be obtained after sufficient coding delay, for DFE less reliable decisions with short or even zero delay must be employed. The approach of TH (Tomlinson-Harashima) precoding has also been known for over three decades, but TH precoding became applied in communication systems only more recently in voiceband modems (beginning with V.34 and continuing with later versions) and in SHDSL (single-line high-speed digital subscriber links).

One main advantage of TH precoding over DFE is the lack or error propagation in the receiver. A second crucial advantage of TH precoding is the possibility to use modulation coding in the same way as in zero-ISI systems because of the absence of decision feedback filtering in the receiver. Therefore, TH precoding should be preferred over DFE whenever possible.

In general, the scope and spirit of the invention may be described by intentionally allowing ISI to achieve higher channel throughput and introducing this ISI in a form which makes dealing with it in transceivers easy. The use of the known technique of TH precoding follows as a necessary consequence.

The higher channel throughput follows from an analysis of the achievable data rate obtained by increasing the modulation rate and accepting lower SNR in return. In an ISI system, SNR is defined at the decision point of a DFE receiver. The lower SNR in the ZEB system is a consequence of transmitting less energy per symbol at higher rate and ignoring the power of ISI at the DFE decision point. When the feedback filter is transferred to the transmitter for TH precoding, the noise at the decision point of the receiver and the spacing between modulation symbols does not change. The appropriate SNR definition remains the same as for a DFE receiver.

With reference to EQ. (2) above, the analysis shows that increasing the modulation rate outweighs the effect of a lower SNR. The data rate R increases linearly with an increase of modulation rate (1/T), but decreases only logarithmically with a decrease in SNR. While it that has been known that increasing the modulation rate is a principal gating factor for achieving higher data rate across a communication channel, there has until now been no introduction of a solution that uses ZEB modulation because of perceived potentially undesirable effects that may accompany it.

As an example for the rate improvement achievable by ZEB modulation, consider first a zero-ISI baseline system employing SQRC filters with $\alpha = 0.25$. Assume a signal-to-noise ratio of SNR=30 dB and coding with an SNR gap to capacity of 6 dB (G=4). From EQ. (2) above, it follows that 7.97 bit per symbol can be transmitted at modulation rate $1/T = 0.8 \times W$ such that the bit rate becomes $R = 6.38$ bit×W.

Now consider a ZEB system transmitting signals at modulation rate $1/T_W = W$ (e.g., where the modulation rate is equal to the available bandwidth). For a fair comparison, the ZEB system has to transmit signals with the same PSD as the zero-ISI system, i.e., the same spectral shaping by SQRC filters shall be employed. An observer measuring the PSD of transmitted signals could not tell a difference between the two systems. In the ZEB system, a signal-to-noise ratio of SNR=27.2 dB is obtained. According to EQ. (1) above, this permits transmission of 7.04 bit per symbol at modulation rate $1/T_W = W$. Hence, $R = 7.04$ bit×W. To achieve the same rate improvement in the zero-ISI baseline system through more sophisticated coding, a coding scheme with an additional coding gain of 2.64 dB would be needed. Achieving such a gain through the ZEB approach instead of resorting to coding and decoding of much higher complexity can therefore be a very attractive solution.

The second aspect of the invention is concerned with a suitable choice of the overall channel symbol response h(D) in a ZEB system. This second aspect ensures that any introduced ISI is in such a form that it may be dealt with very easily in transceivers of a communication system. Because no condition for zero ISI needs to be satisfied, there is no need to adhere to particular symmetries of the shape of spectral roll offs, as is the case with filters implemented using SQRC roll offs. In the literature on DFE and TH precoding, h(D) is usually assumed to be a causal monic polynomial, $h(D)=1+h_1D+h_2D^2+\ldots h_LD^L$ of some finite degree L, corresponding to a finite impulse response (FIR). A further aspect of the invention is to let h(D) be a rational function of D, corresponding to an infinite impulse response (IIR). The simplest such function with a spectral zero at $$D = -1 \left(f = \pm \frac{1}{2T}\right)$$

and a single roll-off parameter $\rho$ is $$h(D) = \frac{1+D}{1-\rho D} = 1 + \frac{\varepsilon D}{1-\rho D} = 1 + \varepsilon D(1 - \rho D + \rho^2 D^2 - \rho^3 D^3 \ldots)$$ EQ. (4)

where $0<\rho\leq 1$ and $\epsilon=1-\rho$. The squared magnitude of this IIR response is plotted in FIG. 9 for $\rho=0.95$, 0.9, and 0.8. For $\epsilon=2^{-n}$, n being an integer, the implementation of the feedback filter in a TH precoder and a corresponding shaping filter as part of the transmit filter are trivial.

Moreover, within a ZEB modulation communication system, the lack of excess bandwidth and the placement of spectral zeroes at the edges of the Nyquist band allows almost all, if not all, digital filtering operations to be performed with 1/T– sampled signals.

BRIEF DESCRIPTION OF THE SEVERAL VIEWS OF THE DRAWINGS

FIG. 4A is a diagram illustrating an embodiment of theoretical, un-realizable brick wall filtering ensuring spectral nulls at band edges of a spectra portion interest.

FIG. 4B is a diagram illustrating an embodiment of realizable filtering ensuring spectral nulls at band edges of a spectra portion interest according to the invention.

DETAILED DESCRIPTION OF THE INVENTION

Figure 1:
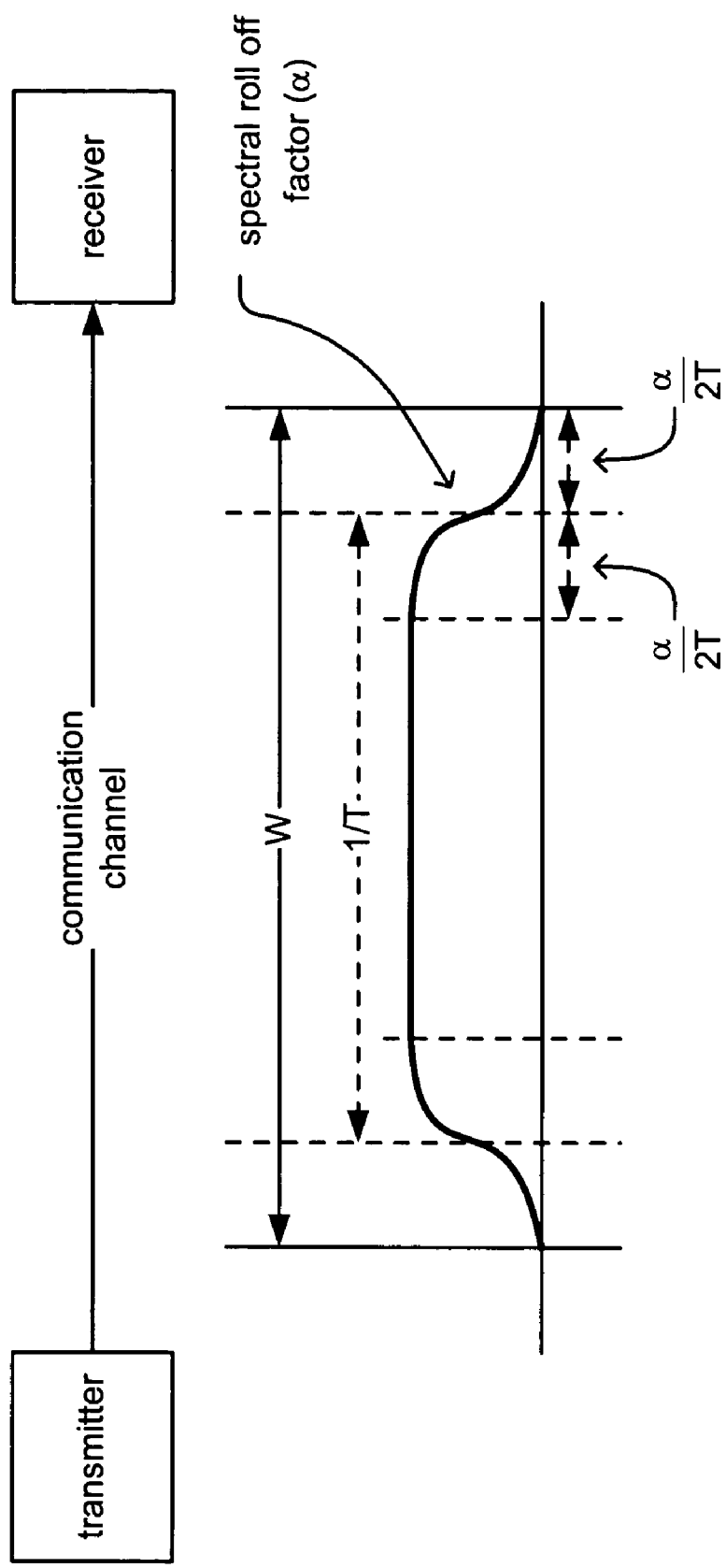
FIG. 1 is a diagram illustrating a prior art communication system supporting a modulation rate of (1/T) across a communication channel of bandwidth (W).
Figure 2:
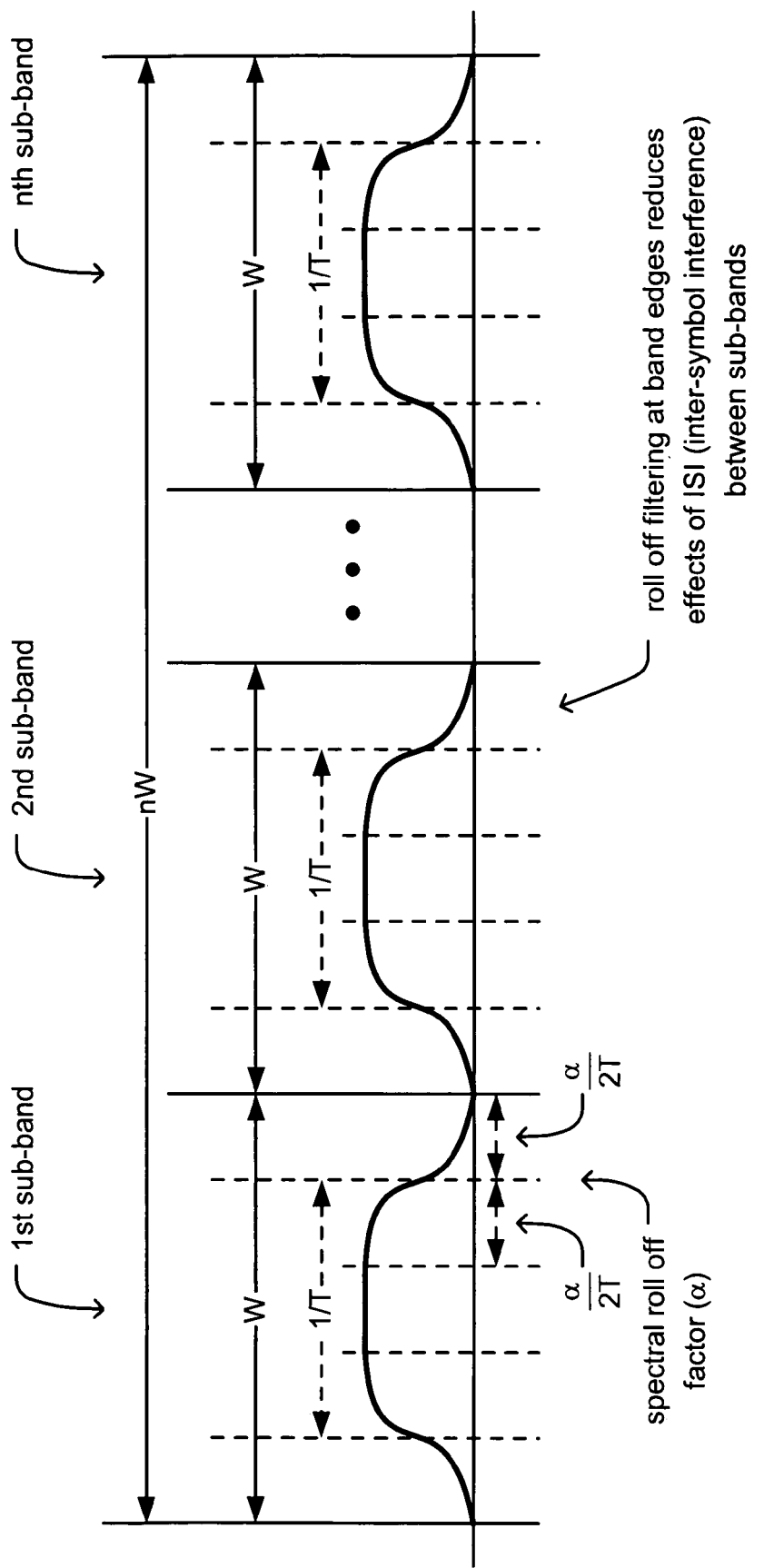
FIG. 2 is a diagram illustrating a prior art approach to support modulation rates of (1/T) across multiple bands of a communication channel of bandwidth (nW).
Figure 3:
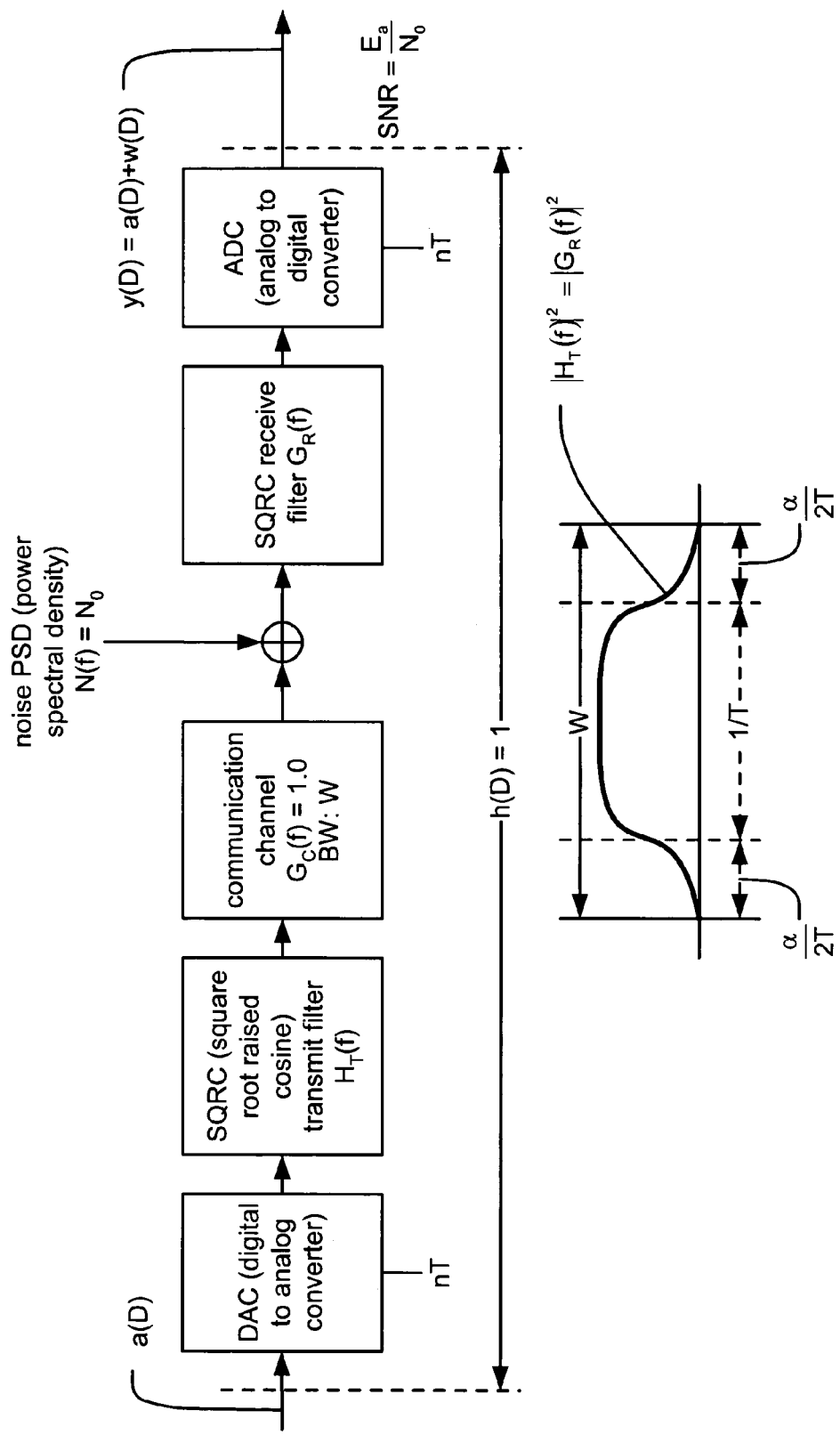
FIG. 3 is a diagram illustrating a prior art, complex baseband model of a zero inter-symbol interference (ISI) baseline system.

The invention aims at extending the modulation rate to the actual bandwidth up the very band edges of the available bandwidth of a communication channel. A motivation for this approach is based on the recognition that modulation rate is the principal gating factor for achieving the highest data rate across a communication channel. To illustrate the leverage of employing a higher modulation rate, a zero ISI (inter-symbol interference) QAM (Quadrature Amplitude Modulation) baseline communication system having a spectral roll off factor of $\alpha=0.25$ and transmitting 8 bit per symbol may be considered. In this consideration, the transmit power and the noise power spectral density is assumed to be fixed.

If the roll off factor could be reduced to $\alpha=0.1$, and if the modulation rate is increased accordingly, a new zero-ISI communication system may then transmit 7.82 bit per symbol at the increased modulation rate; this is equivalent to transmitting 8.88 bit per symbol time when compared to the original zero ISI baseline communication system with $\alpha=0.25$. To achieve a comparable improvement, the original, zero ISI baseline communication system would require an additional coding gain of 2.64 dB.

However, the approach pursued in the present invention is not to achieve rate improvements simply through reduction of the spectral roll offs in a zero-ISI system, which in the limit for $\alpha=0$ would requires unrealizable brick-wall filtering. Instead, while retaining a given spectral shape of the transmitted signal with a given finite roll factor, the modulation rate is increased such that the modulation rate equals the available channel bandwidth. The transmitted signal then exhibits spectral zeroes at the edges of the Nyquist band, which coincide with the edges of the available bandwidth. Hence, such a system exhibits zero excess band bandwidth (ZEB). The spectral zeroes at the edges of the Nyquist band cause necessarily ISI, which in the proposed ZEB system is dealt with by the known technique of TH (Tomlinson-Harashima) precoding.

The advantage of a ZEB system with TH precoding over a zero-ISI baseline system, both systems exhibiting identical transmit spectra with finite roll-off factors, will become apparent in the following description.

FIG. 4A is a diagram illustrating an embodiment of theoretical, un-realizable brick wall filtering ensuring spectral nulls at band edges of a spectra portion of interest. This theoretical, un-realizable brick wall filtering is shown as having a completely flat response throughout the entirety of the communication channel's bandwidth (W). By using such brick wall filtering, a modulation rate having a frequency of $1/T_W = W = (1/T)(1+\alpha)$ may be employed without any degradation of the signal, where T is the modulation rate and $\alpha$ is the spectral roll off factor referenced to the prior art approach that employs SQRC (square root raised-cosine) filters as described above. This filtering enables all of information within the signal whose modulation rate is $1/T_W = W$ to be passed through such a brick wall filter, in that, the brick wall filter includes the entirety of the spectra of the modulation rate, $1/T_W = W$. While a brick wall filtering approach would be ideal to utilize all of the available spectra of a communication channel's bandwidth (W), such brick wall filters are physically un-realizable.

Therefore, the approach provided by the invention does not attempt to employ the theoretical, un-realizable brick wall filtering approach that would be required in a zero ISI baseline communication system; that is to say, in a zero ISI baseline communication system whose modulation rate is equal to the bandwidth of the available band, namely, extended to the very band edges of that available band. Instead, the invention provides a partial response system with spectral nulls (sometimes referred to as spectral zeroes) at the band edges of the available band and TH (Tomlinson-Harashima) precoding in the transmitter are included to provide for an overall gain in the communication system's throughput. The implementation of a realizable filtering approach inherently includes some smoother roll off towards the band edge frequencies of the available band.

FIG. 4B is a diagram illustrating an embodiment of realizable filtering ensuring spectral nulls at band edges of a spectra portion of interest according to the invention. This realizable filtering includes a relatively steep response towards the band edges of the communication channel's bandwidth (W). This realizable filtering is shown as having a relatively flat response throughout the majority of the communication channel's bandwidth (W). By using this filtering, a modulation rate having a frequency of $1/T_W = W = (1/T)(1+\alpha)$ may still be employed; again, where T is the modulation rate and a is the spectral roll off factor referenced to the prior art approach that employs SQRC filters as described above. However, because the filtering characteristics do not perfectly span the entirety of the communication channel's bandwidth (W). As such, a signal whose modulation rate is equal to the available bandwidth (W) of the communication channel, after passing through the filtering of the FIG. 4B, will incur some errors given the fact that the filter covers less frequency spectra than the modulation rate (which spans the entirety of the communication channel's bandwidth (W)).

These errors may be quantified as signal loss due to the spectral shaping performed by the filtering. In an effort to combat this degradation of signal, a certain amount of TH precoding may be performed to the signal. This TH precoding provides a coding gain that exceeds the loss of performance experienced from the fact that the filtering is of a slightly narrower frequency than the modulation rate. Given that the coding gain exceeds the signal loss, the overall effect is that a net gain in overall system performance may be realized. Various embodiments are described in more detail below showing how TH precoding may be implemented, in conjunction to modulating a signal at a modulation rate that occupies an entirety of spectra of an available band, to provide for an overall improvement and increase in the throughput and performance within a communication system.

Figure 5:
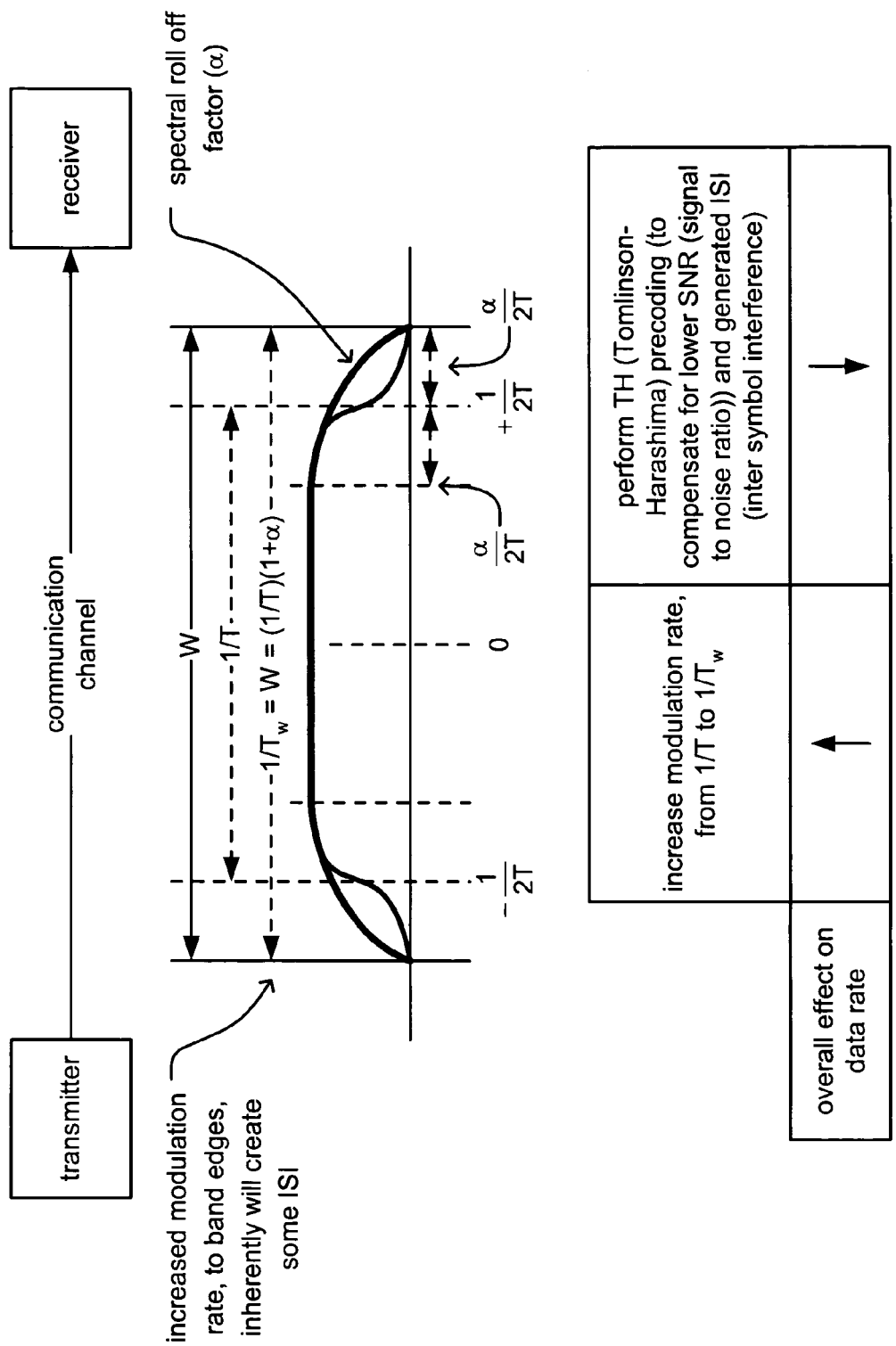
FIG. 5 is a diagram illustrating an embodiment of a communication system supporting a ZEB (zero excess bandwidth) modulation rate (1/T$_W$) across a communication channel of bandwidth (W) according to the invention.

FIG. 5 is a diagram illustrating an embodiment of a communication system supporting a ZEB (zero excess bandwidth) modulation rate ($1/T_W$) across a communication channel of bandwidth (W) according to the invention. Beginning with a general depiction of a communication system including a transmitter communicatively coupled to a receiver via a communication channel, the invention operates by transmitting a signal from the transmitter to the receiver, across the communication channel, whose modulation rate occupies an entirety of spectra of an available band. The available band in this embodiment is the entirety of the communication channel's bandwidth (W). The modulation rate has a frequency of $1/T_W = W = (1/T)(1+\alpha)$, where T is the modulation rate and $\alpha$ is the spectral roll off factor referenced to the prior art approach that employs SQRC filters as described above. That is to say, the modulation rate of a frequency of $1/T_W = W$ may be viewed in the in contrast to the modulation rate employed by a prior art, zero inter-symbol interference (ISI) baseline system.

The increase of the modulation rate according to the invention, by a factor of $(1+\alpha)$ when compared to the modulation rate of a prior art, zero ISI baseline system, provides for an overall increase on the data rate that may be supported between the transmitter and the receiver via the communication channel. However, given the fact that a realizable (non-ideal, non-brick wall filter) filter must be employed, there will inherently be some errors introduced into the signal. In an effort to counter this introduction of errors due to the increased modulation rate in conjunction with the spectral shaping of a realizable filter that does not exhibit a brick wall filter, TH precoding performs, effectively, a channel inversion operation, of the signal before modulating it to the modulation rate that occupies an entirety of spectra of an available band (which is the communication channel's bandwidth (W) in this embodiment). Clearly, this TH precoding comes with some cost. TH precoding generally has an effect to decrease the overall data rate. However, the reduction in overall data rate introduced by the TH precoding is less than the improvement provided by the increase of the modulation rate to the entirety of spectra of an available band. The TH precoding is operable to compensate for the potential errors that may be introduced when the modulation rate is increased to the entirety of the spectra of an available band.

Figure 6:
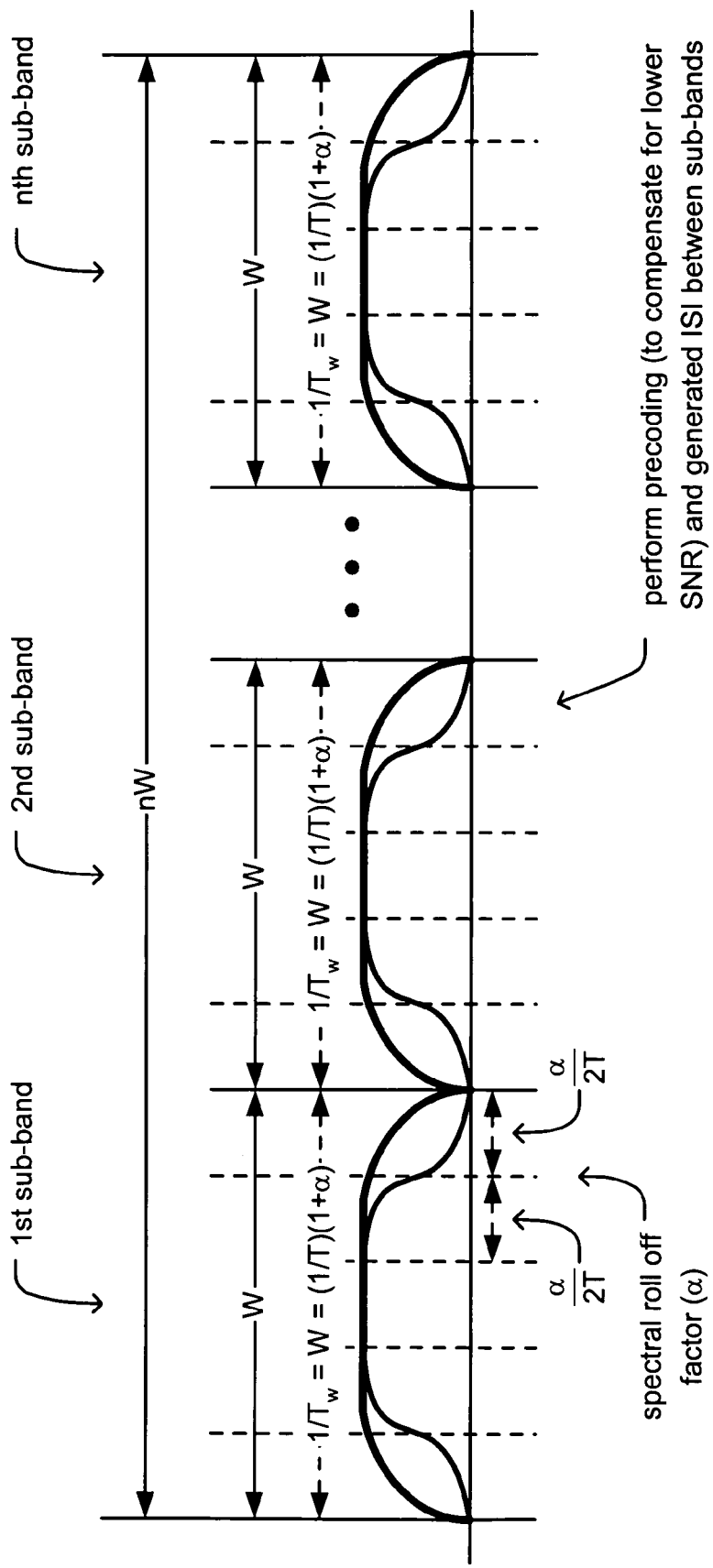
FIG. 6 is a diagram illustrating an approach to support ZEB modulation rates (1/T$_W$) across multiple bands of a communication channel of bandwidth (nW) according to the invention.

FIG. 6 is a diagram illustrating an approach to support ZEB modulation rates ($1/T_W$) across multiple bands of a communication channel of bandwidth (nW) according to the invention. This diagram illustrates how there is no spectral spacing between the sub-bands of the entirety of the communication channel's bandwidth (nW), with the exception of the spectral nulls between the sub-bands at the edges of each sub-band. This communication channel has a bandwidth (nW) that is partitioned into a number of sub-bands. This diagram shows the communication channel of bandwidth (nW) being partitioned into n different sub-bands each having bandwidth (W). To ensure spectral nulls at the edges of the sub-bands, a realizable filter having a somewhat smoother (non-brick wall) response is employed. The modulation rate of each sub-band is shown as having a frequency of $1/T_W = W = (1/T)(1+\alpha)$, where T is the modulation rate and $\alpha$ is the spectral roll off factor again referenced to the prior art approach that employs SQRC filters as described above. It is noted here that the precoding and/or encoding is operable to compensate for an inherently lower SNR and potentially undesirably generated ISI between one or more adjacent bands within the overall communication channel's bandwidth (W).

Figure 7:
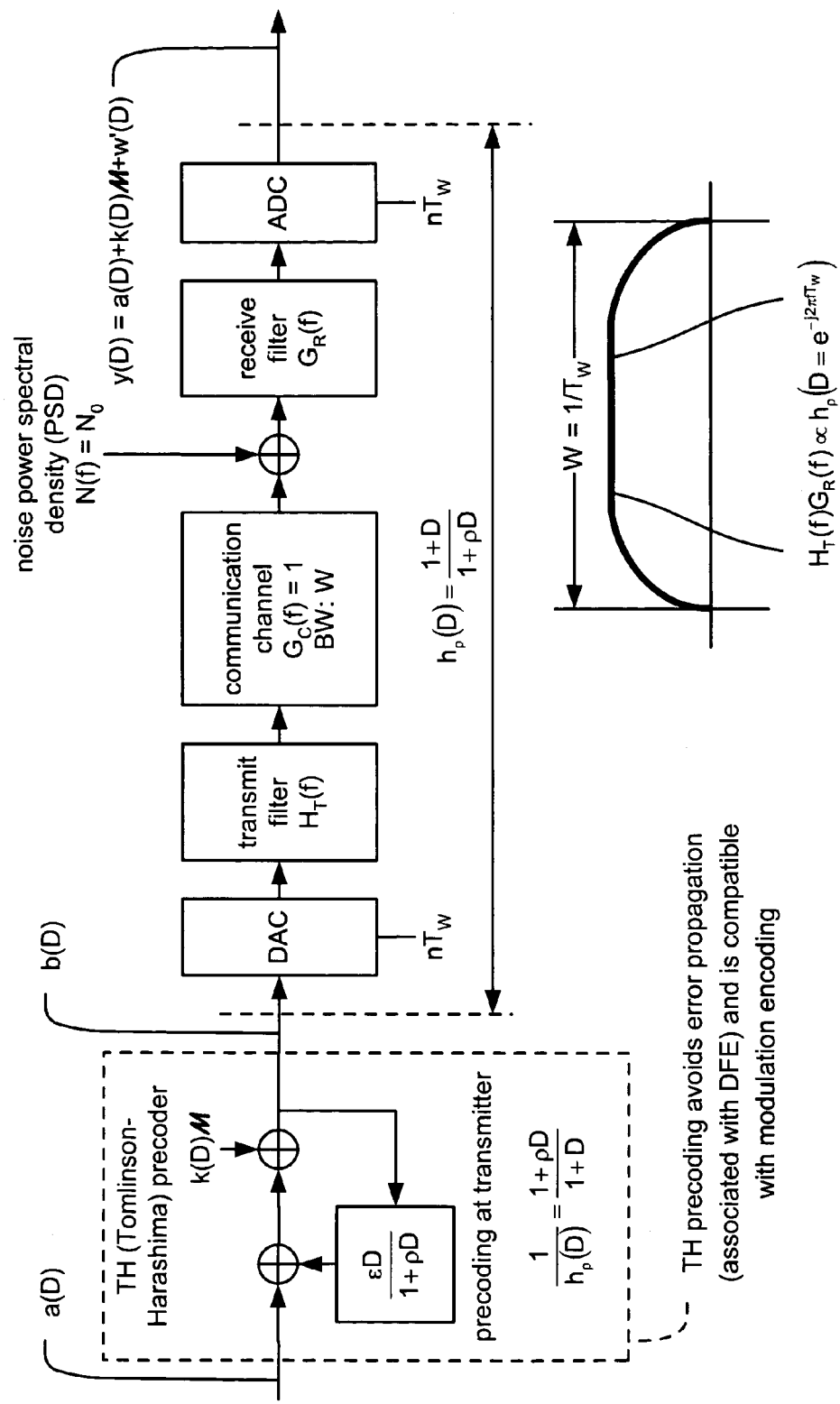
FIG. 7 is a diagram illustrating an embodiment of a complex baseband model of a ZEB communication system with IIR (infinite impulse response) symbol response that employs TH (Tomlinson-Harashima) precoding according to the invention.

FIG. 7 is a diagram illustrating an embodiment of a complex baseband model of a ZEB communication system with an IIR (infinite impulse response) symbol response that employs TH (Tomlinson-Harashima) precoding according to the invention.

In a transmitter end, information bits that have been encoded and appropriately modulated are employed to generate a sequence of discrete-valued modulation symbols. It is also noted that some of these information bits may not be encoded, and they may be employed as uncoded bits when forming one or more of the symbols of the sequence of discrete-valued modulation symbols. These symbols of the sequence of discrete-valued modulation symbols may be of one or more of a number of types of modulation symbols including PAM (pulse amplitude modulation), QPSK (quadrature phase shift keying), 16 QAM (quadrature amplitude modulation), 32 QAM (double square) (e.g., 2 16 QAM constellations offset from one another in a "double square" arrangement), 64 QAM, and so on.

In some instances, combination TCM (Trellis Coded Modulation) coding and modulation encoding may be employed to generate a sequence of discrete-valued modulation symbols that includes a sequence of trellis coded QAM modulation symbols. This sequence of discrete-valued modulation symbols, shown as a(D), is provided to a TH precoder that employs a simple single pole feedback filter and that generates a TH precoded signal, b(D). The operation of the TH precoder may be viewed as being an inverse filtering operation of the overall channel response, $h_\rho(D)$, of the communication channel. For example, after information bits of an input signal have been encoded and appropriately modulated to form the sequence of discrete-valued modulation symbols, a(D), the TH precoder performs a communication channel inverse filtering operation, $1/h_\rho(D)$, on the sequence of discrete-valued modulation symbols, a(D), thereby generating the TH precoded signal, b(D), which may also be viewed as being discrete-time transmit signals. This communication channel inverse filtering operation puts the filtered signal outside of a particular signal region (e.g., beyond the region of the communication channel). Thereafter, the signal is reduced to a value such that it fits within the region of interest using a modulo reduction operation. In general, the operation of the TH precoder may be viewed as being an inverse filtering operation with modulo reduction of the filtered signal.

Again, the precoded signal, b(D), output from the TH precoder may also be viewed as being discrete-time transmit signals. This precoded signal, b(D) (e.g., the discrete-time transmit signals), is then provided to a DAC (digital to analog converter) that converts the precoded signal, b(D), to an continuous time transmit signal whose modulation rate is equal to the bandwidth of the available band (e.g., occupies an entirety of spectra of the available band). This DAC is clocked at a frequency of $nT_W$, where n is an integer and $T_W$ is the modulation rate that occupies the entire bandwidth of the available band. The DAC then generates an analog signal that is then provided to a transmit filter. It is also noted that a digital filter may also be interposed between the TH precoder and the DAC to allow the operation of the transmit filter (situated after the DAC) to operate easier/better in shaping the continuous-time transmit signal to be launched into the communication channel.

As with some of the other embodiments of the invention, the entire bandwidth of the available band is the same as the entirety of spectra of the communication channel into which a signal is launched from the transmitter. This continuous-time transmit signal (which is output from the DAC) is then provided to a transmit filter that performs spectral shaping of the continuous-time transmit signal to ensure spectral nulls substantially at band edges of the available band. The combination of the DAC and the transmit filter may cooperatively be viewed as being a means to generate a continuous-time transmit signal from the discrete-time transmit signals (e.g., from the precoded signal, b(D), sometimes referred to as a discrete-time transmit signals).

The filtered, continuous-time transmit signal is launched into the communication channel that communicatively couples the transmitter and the receiver such that the filtered, continuous-time transmit signal is transmitted across the communication channel from the transmitter to the receiver. The frequency response of the communication channel, having a bandwidth (W), is shown as being $G_C(f)=1$. In addition, as also shown within some of the other embodiments, a certain amount of noise may also be introduced into the continuous-time transmit signal as it is transmitted across the communication channel. In some instances, the noise may be represented as having a PSD (power spectral density): $N(f)=No$ (where an AWGN (additive white Gaussian noise) communication channel is assumed).

A receiver at the other end of the communication channel receives the continuous-time transmit signal that has been transmitted from the transmitter. A receive filter within the receiver is implemented to assist in the spectral shaping of the received signal to continue to ensure spectral nulls substantially at band edges of the available band. The filtering operations performed within the receiver ensure the suppression of any noise and undesired signals that are outside of the available band (e.g., the transmission band employed at the transmitter). These filtering operations performed within the receiver also ensure equalization of the signal within the transmission band.

In certain embodiments, the spectral shaping may be performed only in the transmit filter of the transmitter. Alternatively, the spectral shaping may be performed in both the transmit filter of the transmitter and the receive filter of the receiver. This received, filtered continuous-time transmit signal is then passed to an ADC (analog to digital converter), that is also clocked at the frequency of $nT_W$, where n is an integer and $T_W$ is the modulation rate that occupies the entire bandwidth of the available band), that samples the received (and appropriately filtered) continuous-time transmit signal thereby generating discrete-time receive signals. These generated discrete-time receive signals may undergo further equalization at the modulation rate, if required, to ensure that the generated discrete-time receive signals possess the appropriate characteristics for estimation of the transmitted sequence of information bearing modulation symbols and the information bits encoded therein at the transmitter end of the communication channel. The signal that is output from the ADC is therefore a received sample sequence which is described in more detail below.

Again, as described above in many of the other various embodiments of the invention, the modulation rate of a signal transmitted from a transmitter to a receiver via a communication channel is extended to $1/T_w=W$, or to the entire spectrum of the available band (e.g., equal to the bandwidth of the available band). In this embodiment, as in several others, the entirety of spectra of an available band is the entirety of spectra of the communication channel itself. Alternatively, the entirety of spectra of an available band could be the entirety of spectra of a sub-band of the communication channel.

For comparison with prior art approaches, in order to operate a prior art zero ISI baseline system at this modulation rate (e.g., at modulation rate $1/T_w=W$), it would require the unrealizable brick wall filters (as described above with respect to FIG. 4A) in both the transmitter and receiver. As such, the prior art presents no workable solution by which this may be performed. Clearly, realizable filters should inherently exhibit smoother spectral roll offs towards zero at the band edge frequencies ±W/2 (as described above with respect to FIG. 4B).

The operation of the invention may be achieved by employing partial response signal shaping in combination with (1) decision feedback equalization using a DFE (decision feedback equalizer) in a receiver or (2) TH (Tomlinson-Harashima) precoding in a transmitter. For fixed channels, TH precoding is preferred because it avoids the error propagation problem associated when implementing a DFE in a receiver, and (more importantly) it is more compatible with modulation coding. There are a variety of types of encoding that may be implemented according to the invention as is described below in other of the various embodiments.

One may consider a partial response class-I response which exhibits spectral nulls (or zeroes) at the band edges of a frequency interval of interest as follows:

$$h_{PR-1}(D)=1+D, \ D=e^{-j2\pi fT_w}.$$

However, to achieve a data rate improvement over the baseline zero ISI baseline system, a "fuller" response is needed.

The symbol response considered in this embodiment is shown below:

$$h_\rho(D) = \frac{1+D}{1+\rho D} = 1 + \frac{\varepsilon D}{1+\rho D} = 1 + Dh_1(D)$$

$$h_\rho(D) = 1 + D\varepsilon(1 - \rho D + \rho^2 D^2 - \rho^3 D^3 + \ldots),$$

where $0<\rho\leq 1$ and $\epsilon=1-\rho$.

This symbol response satisfies the requirements for spectral nulls at the band edges of the spectra of interest. This symbol response also provides a flatter spectrum in most of the channel bandwidth. In addition, this symbol response also lends itself to a relative simplicity of implementation.

Figure 8:
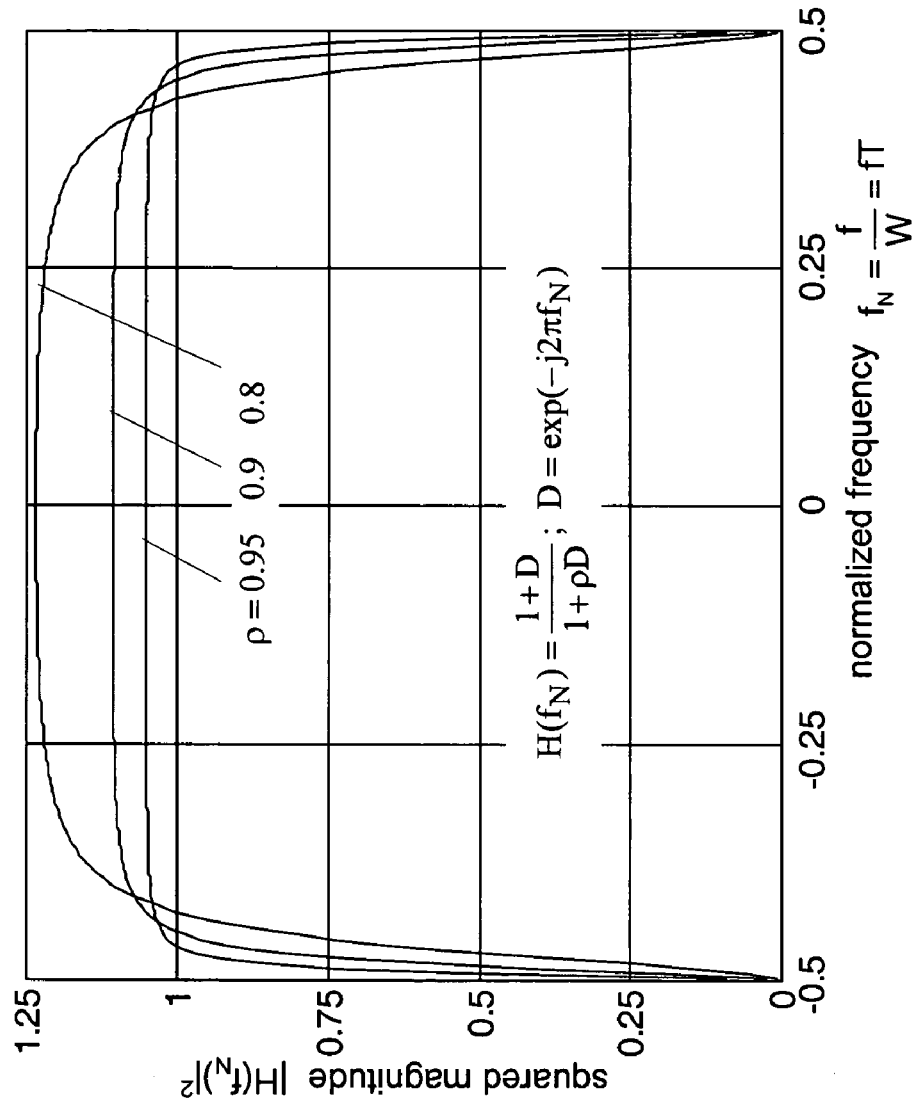
FIG. 8 is a diagram illustrating an embodiment of squared magnitude of IIR response for various IIR filter response factors, $\rho$, according to the invention.

FIG. 8 is a diagram illustrating an embodiment of squared magnitude of IIR (infinite impulse response) response for various IIR filter response factors, shown as ρ, according to the invention. This diagram illustrates the squared magnitude of the partial response, $h_\rho(D=e^{-j\pi 2\pi f_N})$ versus normalized frequency, $$f_N = \frac{f}{W} = fT,$$

(where W is the bandwidth of the available band, and T its inverse) for several values of filter response factor, ρ. The following relationship is also noted:

$$1 + \sum_{i=1}^{\infty} |h_{\rho,i}|^2 = 1 + \varepsilon^2(1 + \rho^2 + \rho^4 + \rho^6 + \ldots) = 1 + \frac{\varepsilon}{1+\rho} = \frac{2}{1+\rho}.$$

Referring back to FIG. 8, while the feedback filter shown in the TH precoder illustrated and described above with respect to FIG. 8 is shown as being a simple single pole filter, the FIR (finite impulse response) filter that is typically shown in the literature in accordance with TH precoding may also be employed without departing from the scope and spirit of the invention as well.

It is noted that the TH precoding does in fact incur some precoding loss. Precoding loss may be defined as the ratio $E_b/E_a$, where $E_b=E\{|b_n|^2\}$ is the average energy of the transmitted precoded signals, and $E_a=E\{|a_n|^2\}$ is the average energy of the digital signals before undergoing precoding.

For a quantifiable example of the precoding loss that may be incurred using TH precoding, a modulation employing an M×M QAM (Quadrature Amplitude Modulation) constellation is considered. For M×M-QAM constellations, this precoding loss ratio becomes $M^2/(M^2-1)$. More specifically, for 64 QAM (M=6) the ratio is 1.016 (0.068 dB), and for 256 QAM (M=8) the ratio is 1.0039 (0.017 dB). Therefore, the overall precoding losses incurred by performing TH precoding, for constellations of this size, are practically negligible.

It is noted here that the overall improvement in data rate, when employing the invention, may be analyzed in two different steps. In the first case, the symbol response $h_\rho(D)$ is formed entirely in the transmit filter. In this first case, the receive filter is still an unrealizable brick wall filter. In the second case, the symbol response shaping (e.g., filtering) may be equally split between the transmit filter and the receive filter at both ends of the communication channel.

The first case involves spectral shaping that is performed only in the transmitter.

The transmit filter, $H_T(f)$, and the receive filter, $G_R(f)$, may be characterized as follows:

$$H_T'(f) = \sqrt{\frac{T_w(1+\rho)}{2(1+\alpha)}} \ h_{iir}(D_w = e^{-j2\pi fT_w}), \ |f| \leq W/2; \ 0 \text{ otherwise}$$

$$G_R'(f) = \left\{\sqrt{\frac{T_w 2(1+\alpha)}{1+\rho}}, \ |f| \leq W/2; \ 0 \text{ otherwise.}\right.$$

The filter functions are normalized such that $\int_{-W/2}^{W/2} |H_T'(f)|^2 df = 1/(1+\alpha)$ and $H_T'(f)G_R'(f)=T_w \times h_\rho(D=e^{-j2\pi T_w})$. This ensures that the transmit power $P_T$ is the same as in the zero ISI baseline system described above:

$$P_T = \frac{E_a}{(1+\alpha)T_w} = \frac{E_a}{T}.$$

The received sample sequence then becomes $$y(D)=h_{iir}(D)b(D)+w'(D)=a(D)+k(D)M+w'(D),$$

where M is the modulus used by the precoder, and k(D) is a complex integer sequence chosen by the precoder such that the real and imaginary parts of the precoded signals $b_n$ are contained in the interval [−M/2, +M/2]. For M×M QAM constellations with minimal symbol spacing $d_0$, $M=d_0M$.

The noise samples are uncorrelated and exhibit variance may be described as follows:

$$\sigma_w'^2 = N_0 \frac{2(1+\alpha)}{1+\rho}.$$

From one perspective, the receive filter may be viewed as the optimum whitening matched filter for a capacity achieving system, when $H_T'(f)$ is given. The signal-to-noise ratio (SNR') relevant for decoding is given as follows:

$$SNR' = \frac{E_a}{\sigma_w'^2} = SNR\frac{1+\rho}{2(1+\alpha)},$$

where SNR is the signal-to-noise ratio of the baseline system. The rate achievable with an SNR-gap of G then becomes $$R' = \frac{1}{T_w}\log_2\left(1 + \frac{SNR'}{G}\right) \text{bit/sec}.$$

For comparison with the baseline system, the modulation rate must be expressed in bits per symbol time T of the baseline system, as follows $$R'T = (1+\alpha)\log_2\left(1 + \frac{SNR}{G}\frac{1+\rho}{2(1+\alpha)}\right) \text{bit}.$$

Therefore, it can be seen that the overall performance of throughput of the communication system is improved by increasing the modulation rate.

The second case involves spectral shaping in both the transmitter and the receiver.

The transmit filter, $H_T(f)$, and the receive filter, $G_R(f)$, may be now characterized as follows:

$$H_T''(f) = \left\{\sqrt{\frac{T_w}{(1+\alpha)g}}\sqrt{h(D = e^{-j2\pi fT_w})}, \quad |f| \leq W/2; \quad 0 \text{ otherwise}\right.$$

$$G_R'' = \left\{\sqrt{T_w(1+\alpha)g}\sqrt{h(D = e^{-j2\pi fT_w})}, \quad |f| \leq W/2; \quad 0 \text{ otherwise.}\right.$$

To achieve the same transmit power as in the zero ISI baseline system described above, g is determined such that $\int_{-W/2}^{W/2}|H_T^*(f)|^2 df = 1/(1+\alpha)$:

$$g = T_w\int_{-W/2}^{W/2}|h(D = e^{-j2\pi fT_w})|df$$

(by numerical integration).

The variance of the noise samples to the receive-filter output is given by $$\sigma_w''^2 = N_0(1+\alpha)gT_w\int_{-W/2}^{W/2}|h_{iir}(D = e^{-j2\pi fT'})|df = N_0(1+\alpha)g^2,$$

so that $$SNR'' = \frac{E_a}{\sigma_w''^2} = SNR\frac{1}{g^2(1+\alpha)}.$$

Because of the spectral nulls (or zeroes) of the receive filter at the band edges, the noise is not entirely uncorrelated. However, the non-whiteness is limited to a narrow frequency range. Ignoring this fact, the rate per symbol time T of the baseline system becomes $$R''T = (1+\alpha)\log_2\left(1 + \frac{SNR}{G}\frac{1}{g^2(1+\alpha)}\right) \text{bit.}$$

Again, it can be seen that the overall performance of throughput of the communication system is improved by increasing the modulation rate.

While the zero ISI baseline system described above has been used in comparison to illustrate the improvements provided by the invention, it is also noted that a ZEB (zero excess bandwidth) modulation communication system may nevertheless be realized using SQRC filters with the exception that the phase characteristic of those SQRC filters is modified such that the overall symbol response becomes causal. Alternatively, the required phase change could be achieved by an adaptive equalizer. By doing this, the same SQRC transmit and SQRC phase filters could be used as in an existing zero ISI baseline communication system. The main difference is that the zero ISI baseline communication system operates at a modulation rate of $1/T=W/(1+\alpha)$, whereas the ZEB modulation communication system operates at a modulation rate of $1/T_W=W=(1/T)(1+\alpha)$.

This analysis requires the spectral factorization shown as follows:

$$|H_{rc}(f,\alpha)|^2 = h_{rc}(D^{-1})A^2 h_{rc}(D), D = e^{-2\pi fT_w},$$

where $H_{rc}(f,\alpha)$ is a RC (raised cosine) spectrum with spectral nulls at $f=\pm W/2$ and roll off factor, $\alpha$. The polynomial $h_{rc}(D)$ has to be monic and causal, and represents the overall system response to be achieved jointly by the transmit filter and the receive filter. The amplitude characteristics of $H_{rc}(f,\alpha)$ and $h_{rc}(D=e^{-j2\pi T_w})$ differ only by a scaling factor.

The factorization approach for determining $h_{rc}(D)$ and $A^2$ can be found in Appendix III of G. D. Forney and G. Ungerboeck, "Modulation and coding for linear Gaussian channels" *IEEE Trans. Inform. Theory*, vol. 44, pp. 2384-2415, October 1998.

The transmit filter and the receive filter must be such that $H_T(f)G_R(f)=T_W h_{rc}(e^{-j2\pi fT_w})$. If the spectral shaping is equally split between the transmit filter and the receive filter, then both filters have the characteristic of a SQRC filter. It is therefore noted that a ZEB modulation communication system, employing SQRC filters within the transmit filter and the receive filter, has a marked performance improvement over a zero ISI baseline communication system that also employs SQRC filters within the transmit filter and the receive filter. The increased modulation rate of the ZEB modulation communication system, coupled with TH precoding, provides for an increase in the data throughput of the communication system.

Figure 9:
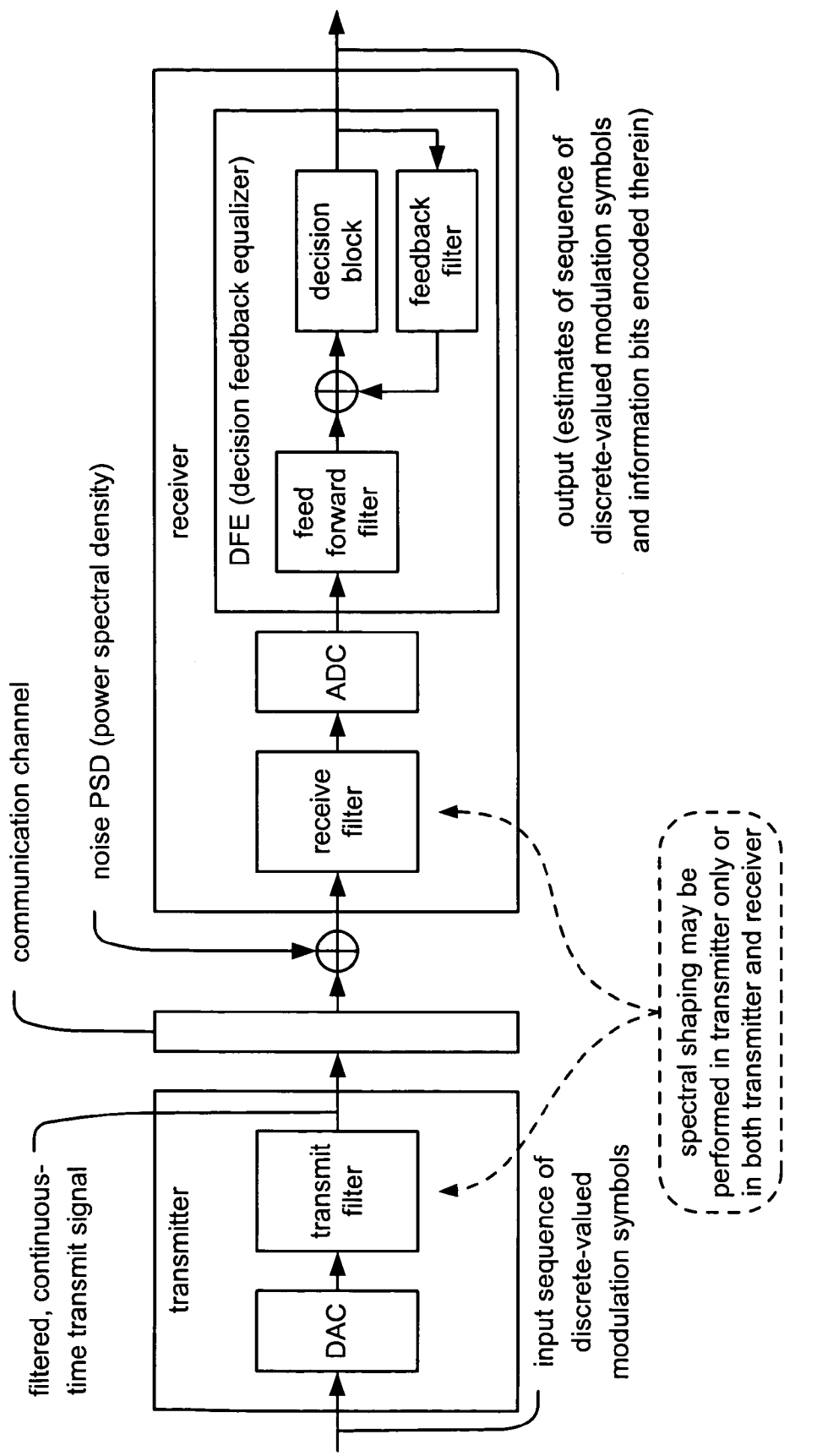
FIG. 9 is a diagram illustrating an embodiment of a complex baseband model of a ZEB communication system according to the invention.

FIG. 9 is a diagram illustrating an embodiment of a complex baseband model of a ZEB communication system according to the invention. Again, as described in some of the other embodiments, a signal generated within a transmitter is launched across a communication channel to a receiver. The communication channel will typically introduce a certain degree of noise having a certain PSD (power spectral density).

Within the transmitter, a signal that includes a sequence of discrete-valued modulation symbols is provided to a DAC (digital to analog converter) that converts the sequence of modulation symbols into discrete-time transmit signals. The DAC operates by inserting the discrete-time transmit signals at the modulation rate (which is equal to the bandwidth of the available band) thereby generating a continuous-time transmit signal. Within this embodiment as within others described herein, the entire bandwidth of the available band is the entirety of spectra of the communication channel itself. This continuous-time transmit signal is then provided to a transmit filter that performs spectral shaping of thereof to ensure spectral nulls (or zeroes) substantially at band edges of the available band; the output of the transmit filter may be viewed as being a filtered, continuous-time transmit signal in this embodiment. The filtered, continuous-time transmit signal is then launched into the communication channel that communicatively couples the transmitter to the receiver, and the filtered, continuous-time transmit signal is thereby transmitted from the transmitter to the receiver via the communication channel.

Within the receiver, a receive filter may be implemented to assist in the spectral shaping of the received continuous-time signal (e.g., a continuous-time receive signal) to continue to ensure spectral nulls (or zeroes) exist substantially at the band edges of the available band. In certain embodiments, the spectral shaping may be performed only in the transmitter. Alternatively, the spectral shaping may be performed in both the transmit filter of the transmitter and the receive filter of the receiver. This filtered, continuous-time receive signal is then passed to an ADC (analog to digital converter) that samples the filtered, continuous-time receive signal at the modulation rate that is equal to the bandwidth of the available band to generate discrete-time receive signals.

In this embodiment, in an effort to correct for any possible errors that may have been introduced into the signal during transmission across the communication channel, a DFE (decision feedback equalizer) performs decision feedback equalization on the discrete-time receive signals. This DFE operates to ensure that the discrete-time receive signals possess the appropriate characteristics such that these discrete-time receive signals may subsequently undergo appropriate decoding to estimate the transmitted sequence of information bearing modulation symbols and outputting the estimated information bits encoded therein.

There are a variety of ways in which a DFE may be implemented. However, at a very minimum a DFE structure includes a feed forward filter that receives input, a decision block that makes hard decisions of the input that has been feed forward filtered, and a feedback filter that adds an error signal (corresponding to previous hard decisions that have been appropriately weighted/filtered by the feedback filter) into the output from the feed forward filter. In doing this, any ISI that may have been undesirably introduced into the symbols that are provided to the DFE may be canceled out at the output of the feed forward filter by subtracting past symbol values that have been appropriately weighted.

In other words, previous hard decisions are fed back to influence subsequent hard decisions within the DFE in an effort to combat and (ideally) eliminate undesirable effects such as ISI. Cooperatively, the operation of the feed forward filter, the decision block, and the feedback filter are typically described as being a DFE structure. It is noted here that the operation of the invention may be achieved by employing partial response signal shaping in combination with either (1) decision feedback equalization using a DFE in the receive end of the communication channel or (2) TH precoding in the transmit end of the communication channel. The embodiment shown in the FIG. 9, using a DFE structure, may be implemented as an alternative embodiment of the invention when TH precoding is not as desirable in the transmit end of a communication system.

Figure 10:
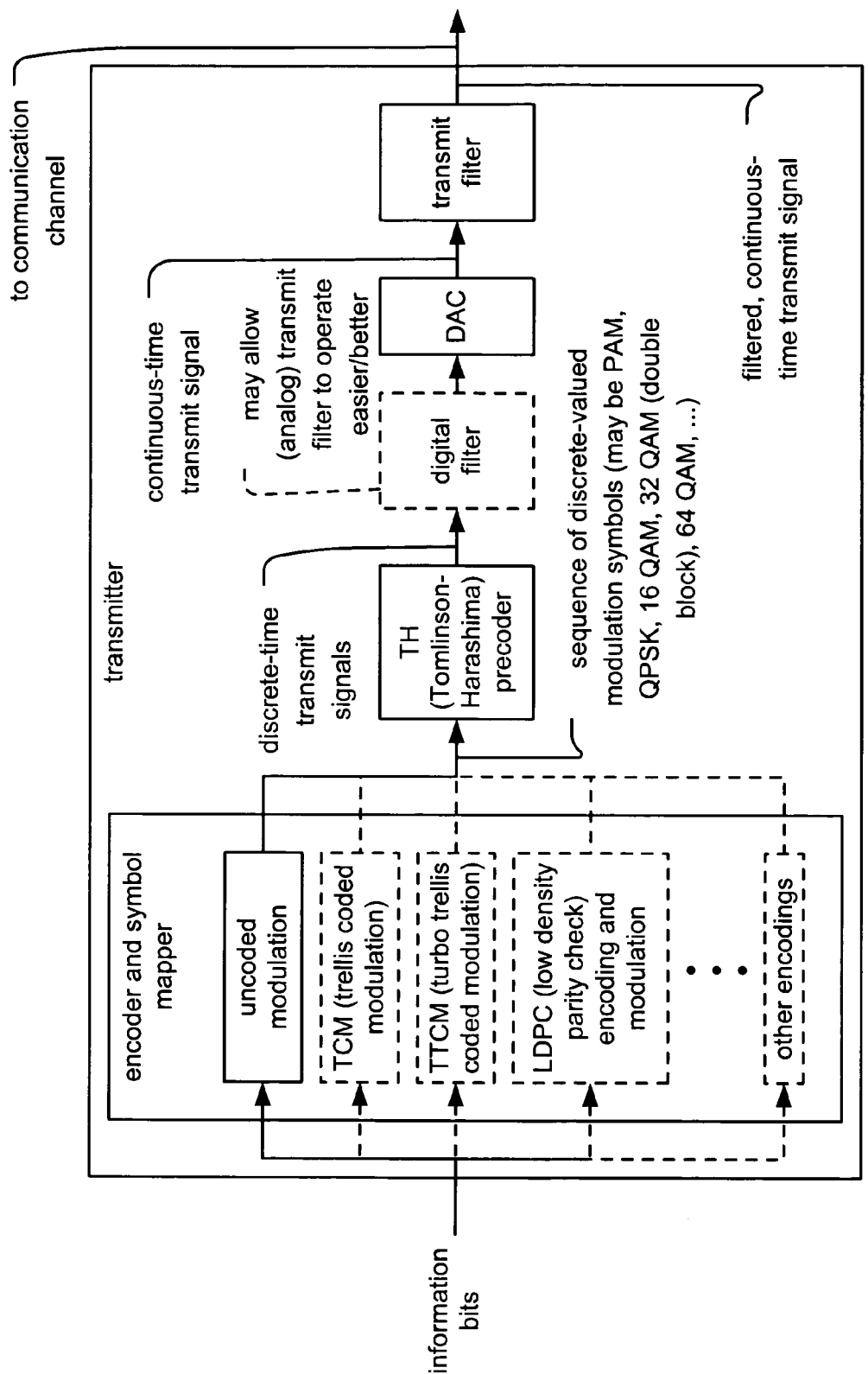
FIG. 10 is a diagram illustrating an embodiment of a ZEB modulation communication transmitter including various forms of encoding and symbol mapping and TH precoding according to the invention.

FIG. 10 is a diagram illustrating an embodiment of a ZEB modulation communication transmitter including various forms of encoding and symbol mapping and TH precoding according to the invention. The communication transmitter shown in this embodiment supports any one of any number of types of encoding of information bits. In addition, whichever encoding is implemented in this embodiment is performed in combination with TH (Tomlinson-Harashima) precoding in the transmitter as well.

Information bits are provided to the transmitter that is operable perform appropriate encoding and TH precoding before launching an appropriately filtered, continuous-time transmit signal into a communication channel. After the signal has been launched into the communication channel from the transmitter, the signal is communicated from the transmitter to a receiver at the other end of the communication channel. The communication channel may introduce a certain degree of noise having a particular PSD.

Within the transmitter, encoding of these information bits is performed using an encoder and symbol mapper. This encoder and symbol mapper may be implemented to support uncoded modulation, TCM (trellis coded modulation), TTCM (turbo trellis coded modulation), LDPC (low density parity check) encoding and modulation, as well as any other types of encodings that operate to counter the effects of lowered SNR and potentially introduced ISI that may be generated by the increase of the modulation rate of the signal to a value that is equal to the bandwidth of the available band.

After the information bits have been appropriately encoded using whichever encoding means is employed within a particular embodiment, the encoded bits may be grouped to form symbols that may be symbol mapped according to any number of different types of modulations (where each modulation includes a constellation shape and unique mapping of the constellation points included therein). For examples, in one embodiment, rate ¾ turbo encoding may be employed in accordance with TTCM by the encoder and symbol mapper such that 4 encoded bits are output for every 3 information bits that are input to the encoder. These 4 encoded bits may be grouped to form a symbol that is symbol mapped according to a modulation that employs 4 bit symbols (e.g., a 16 QAM modulation that includes a 16 QAM shaped constellation, having 16 constellation points, and has a unique mapping for each of the constellation points included therein). Also, other encoding techniques may also be implemented without departing from the scope and spirit of the invention including puncturing of 1 or more of the encoded bits that are output from the encoder, rearranging the order of 1 or more of the encoded bits that are output from the encoder, and so on.

After the information bits have been appropriately encoded and symbol mapped thereby generating a sequence of discrete-valued modulation symbols, then this resulting sequence of discrete-valued modulation symbols is provided to a TH (Tomlinson-Harashima) precoder that operates in the manner as described above within other of the various embodiments. Again, the operation of the TH precoder may be viewed as being an inverse filtering operation of the overall channel response of the communication channel.

When a ZEB modulation communication transmitter employs any one of the types of encodings described herein, a corresponding ZEB modulation communication receiver (that receives a signal transmitted from the ZEB modulation communication transmitter via a communication channel) is then operable to perform the appropriately corresponding decoding of such an encoded and transmitted signal. In addition, the receiver knows which modulation type (including the constellation shape and mapping of the constellation points therein) has been employed by encoder and symbol mapper of the transmitter, so that the receiver may appropriately decode the transmitted sequence of information bearing symbols sent from the transmitter.

For example, when the ZEB modulation communication transmitter employs uncoded modulation in conjunction with a particular symbol mapping of a constellation, then a ZEB modulation communication receiver is operable to decoding of such a sequence of discrete-valued uncoded modulation symbols with knowledge of the manner in which the information bits have been symbol mapped in the encoder and symbol mapper within the transmitter.

Similarly, when the ZEB modulation communication transmitter employs TCM within the encoder and symbol mapper, then a ZEB modulation communication receiver is operable to decoding of such a sequence of discrete-valued uncoded modulation symbols with knowledge of the manner in which the information bits have been encoded and symbol mapped in the encoder and symbol mapper within the transmitter according to the particular implementation of TCM.

In short, a corresponding ZEB modulation communication receiver is operable to perform appropriate decoding of a received signal with knowledge of the particular manner in which information bits had been encoded and symbol mapped in the encoder and symbol mapper within the transmitter.

It is also noted that the encoding and symbol mapping within the transmitter may be performed using any of a variety of modulation types including PAM (pulse amplitude modulation), QPSK (quadrature phase shift keying), 16 QAM (quadrature amplitude modulation), 32 QAM (double square) (e.g., 2 16 QAM constellations offset from one another in a "double square" arrangement), 64 QAM, and so on.

Within the transmitter shown in this embodiment, the sequence of discrete-valued modulation symbols is input to the TH precoder where that sequence is conditioned to generate discrete-time transmit signals. These discrete-time transmit signals are then provided to a DAC that operates by inserting the discrete-time transmit signals at a modulation rate that is equal to the bandwidth of the available transmission band thereby generating a continuous-time transmit signal.

In one embodiment, the bandwidth of the available transmission band is the entire bandwidth of the communication channel itself. In another embodiment, the bandwidth of the available transmission band is the entire bandwidth of a sub-band of the communication channel. The resulting continuous-time transmit signal is then provided to a transmit filter that performs spectral shaping of the continuous-time transmit signal to ensure that spectral nulls (or zeroes) are located substantially at the band edges of the allowed transmission band. Ultimately, the resulting, filtered continuous-time transmit signal is then launched into the communication channel.

Figure 11:
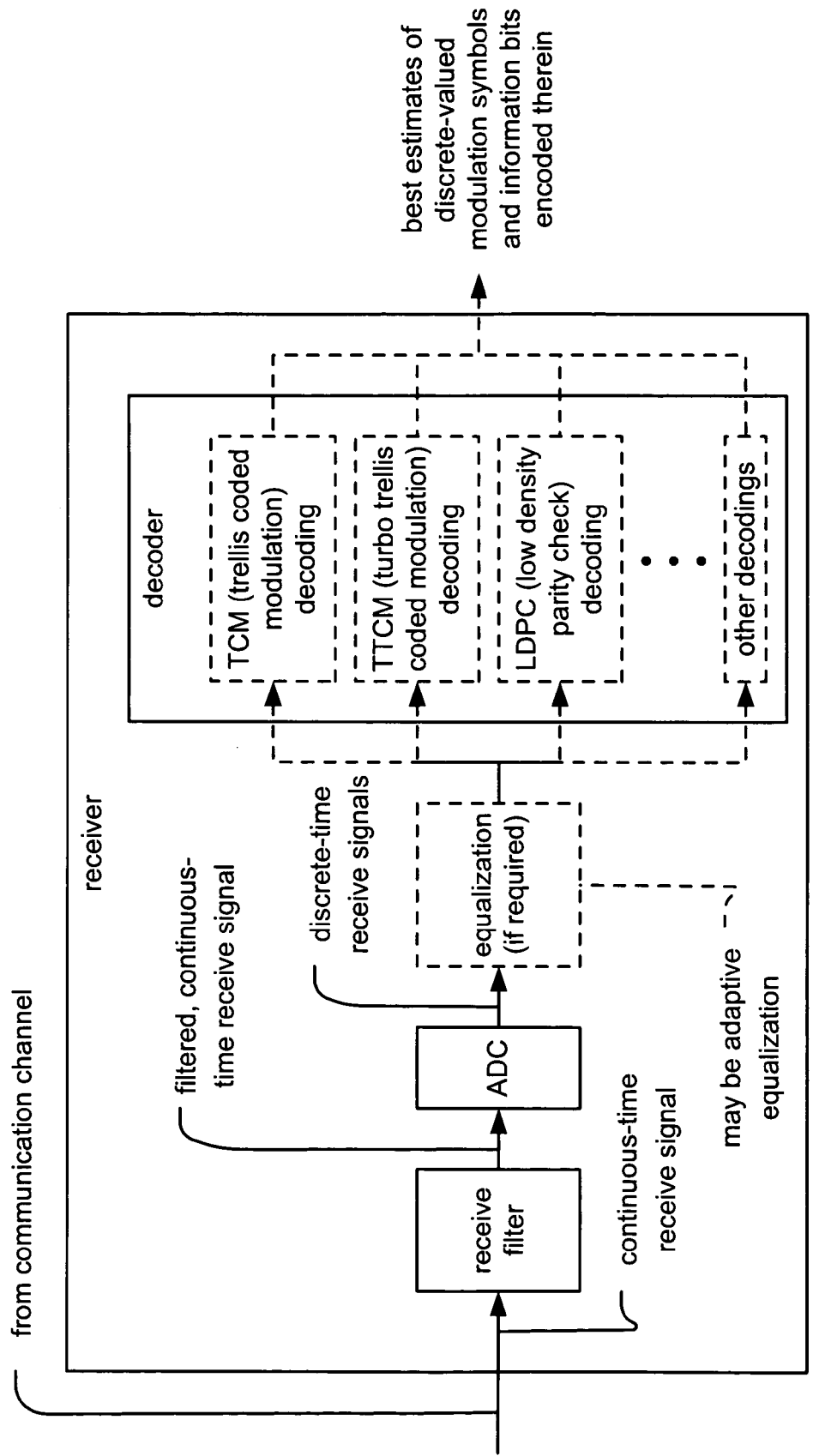
FIG. 11 is a diagram illustrating an embodiment of a ZEB modulation communication receiver according to the invention.

FIG. 11 is a diagram illustrating an embodiment of a ZEB modulation communication receiver according to the invention. The ZEB modulation communication receiver in this embodiment may be viewed as being a ZEB modulation communication receiver that operates in conjunction with the corresponding ZEB modulation communication transmitter described above with respect to the FIG. 10.

A filtered, continuous-time signal that has been transmitted across a communication channel (from a ZEB communication transmitter) is received by the ZEB modulation communication receiver. At the receiver end of the communication channel, this received continuous-time signal may be referred to as a continuous-time receive signal. The continuous-time receive signal is provided to a receive filter that may be implemented to perform spectral shaping of the continuous-time receive signal to ensure suppression of noise and any other undesired signals outside of the transmission band and also to ensure equalization of the continuous-time receive signal within the transmission band. Moreover, this receive filter may operate to perform spectral shaping, in conjunction with a transmit filter at the transmitter end of the communication channel (e.g., in conjunction with the transmit filter within the ZEB communication transmitter), to ensure that spectral nulls (or zeroes) exist at the band edges of the allowed transmission band. As described above within other embodiments, the spectral shaping that is performed to ensure these spectral nulls at the band edges of the available transmission band may be performed in the transmitter alone (using a transmit filter) or in both the transmitter and the receiver (cooperatively using both a transmit filter and a receive filter).

This now filtered, continuous-time receive signal (output from the receive filter) is then sampled using an ADC (analog to digital converter) at the modulation rate thereby obtaining discrete-time receive signals. Again, this modulation rate is equal to the bandwidth of the available band.

These obtained discrete-time receive signals are then provided to a decoder where they undergo appropriately corresponding decoding. That is to say, these discrete-time receive signals now undergo decoding in a manner that corresponds to the manner in which information bits have been encoded and symbol mapped at the transmitter end of the communication channel (e.g., in the ZEB communication transmitter). For example, the decoder may be implemented to perform TCM decoding, TTCM decoding, LDPC decoding, or any number of other types of decodings that correspond to manner in which information bits are encoded at the transmitter end of the communication channel.

If required, additional equalization (usually implemented as adaptive equalization) may be performed (after the sampling that is performed by the ADC) at that same modulation rate to ensure that the received signal has the characteristics that are required for subsequent estimation of the transmitted sequence of information bearing modulation symbols and the information bits encoded therein.

Figure 12:
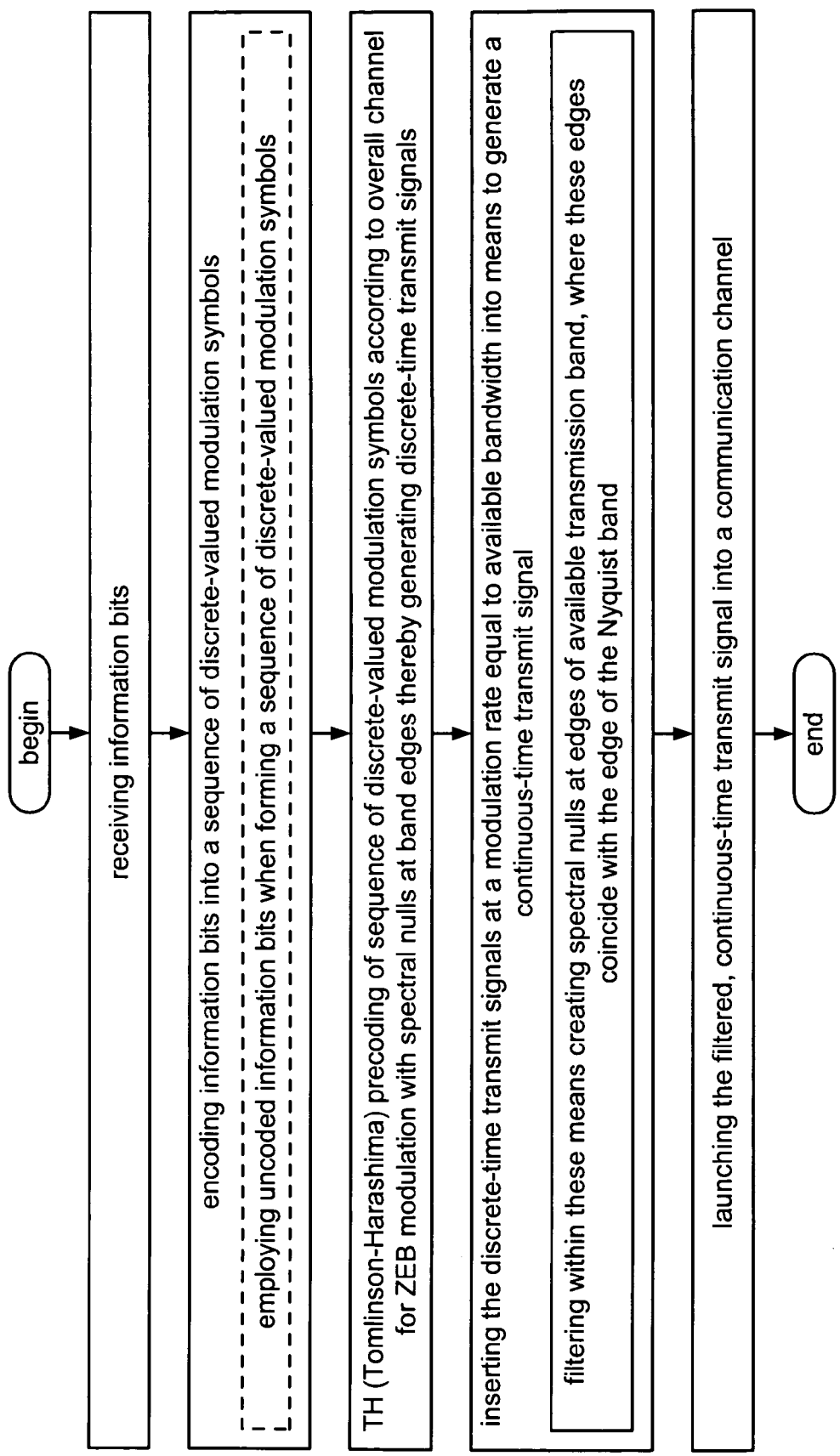
FIG. 12 is a flowchart illustrating an embodiment of a ZEB modulation transmit method that is performed according to the invention.

FIG. 12 is a flowchart illustrating an embodiment of a ZEB modulation transmit method that is performed according to the invention. Initially, the method involves receiving information bits. The method then involves encoding those information bits into a sequence of discrete-valued modulation symbols. These encoded bits may be generated using any of the various means of encoding described herein (e.g., including TCM, TTCM, LDPC, and so on). This may also involve employing uncoded information bits when forming the sequence of discrete-valued modulation symbols. This step also involves performing any appropriate symbol mapping of the encoded bits (and/or uncoded information bits) when generating this sequence of discrete-valued modulation symbols.

The method then performs TH (Tomlinson-Harashima) precoding of the sequence of discrete-valued modulation symbols according to overall channel for ZEB modulation with spectral nulls at band edges thereby generating discrete-time transmit signals. The method then involves inserting these discrete-time transmit signals at a modulation rate equal to available bandwidth into means to generate a continuous-time transmit signal. This means also performs filtering that creates spectral nulls (or zeroes) at the edges of the available transmission band, where these edges coincide with the edge of the Nyquist band. This means may be implemented using a DAC (digital to analog converter) in conjunction with a transmit filter to generate a filtered, continuous-time transmit signal. The method then operates by launching the filtered, continuous-time transmit signal into a communication channel. This filtered, continuous-time transmit signal may then be transmitted from a communication transmitter to a communication receiver via the communication channel.

Figure 13:
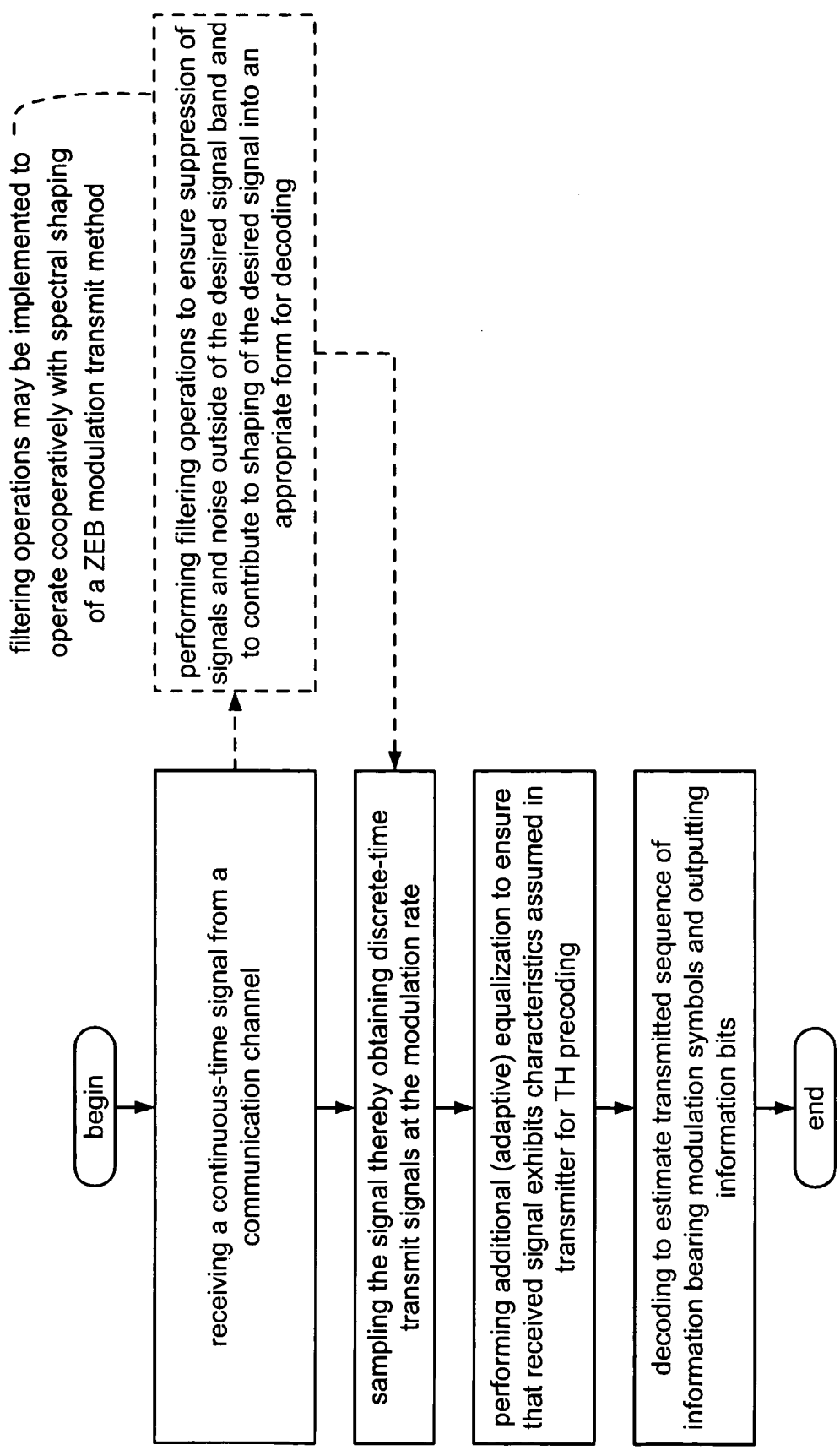
FIG. 13 is a flowchart illustrating an embodiment of a ZEB modulation receive method that is performed according to the invention.

FIG. 13 is a flowchart illustrating an embodiment of a ZEB modulation receive method that is performed according to the invention. Initially, the method operates by receiving a continuous-time signal from a communication channel (this received signal may be referred to as a continuous-time receive signal).

The method may then operate by performing filtering operations to ensure suppression of signals and noise outside of the desired signal band and to contribute to shaping of the desired signal into an appropriate form for decoding. These filtering operations may be implemented to operate cooperatively with spectral shaping that is performed within a ZEB modulation transmit method.

The method then continues by sampling the signal thereby obtaining discrete-time transmit signals at the modulation rate. The method may also involve performing additional (e.g., usually "adaptive") equalization to ensure that the received signal exhibits characteristics assumed at the transmitter end of the communication channel for TH precoding. The method ultimately involves performing decoding to estimate the transmitted sequence of information bearing modulation symbols and outputting the corresponding information bits.

It is also noted that the various methods described above and corresponding to FIG. 12 and FIG. 13 may be performed within any number of communication devices, including (where appropriate) communication transmitters, communication receivers, and/or communication transceivers.

The invention illustrates the importance and benefits that may be realized when choosing the highest possible modulation rate (or symbol rate) possible. In a given spectra of interest within an available band, this includes the entirety of the spectra of that available band. In various instances, this includes the entirety of the spectra of a sub-band of a communication channel's bandwidth or the entire communication channel's bandwidth itself.

Some final remarks are provided here to quantify some of the many performance benefits provided by the invention. A ZEB modulation communication system with IIR response $h_\rho(D)=(1+D)/(1+\rho D)$, $\rho=0.9$, achieves a rate increase of 1.5 bit compared to a zero ISI baseline communication system operating at 8 bits/symbol using SQRC filters with spectral roll off factors of $\alpha=0.25$. This is the spectral roll off factor used for upstream transmission within the DOCSIS (Data Over Cable Service Interface Specification) 1.0/1.2 cable systems. To achieve this same rate increase in a zero ISI baseline communication system, the SNR would have to be increased by at least 4.5 dB. Alternatively, an additional coding gain (SNR-gap reduction) of 4.5 dB would be needed to provide for such improved performance within a zero ISI baseline communication system. The rate improvements are still 1.0 bit (or 3 dB) over such a zero ISI baseline communication system with a spectral roll off factor of $\alpha=0.18$, and the rate improvements are even 0.65 bit (or 1.95 dB) over such a zero ISI baseline communication system with a spectral roll off factor of $\alpha=0.12$. These are the spectral roll off factors employed in the ITU (International Telecommunication Union) J.83-Annex B modes for downstream transmission in cable systems (e.g., $\alpha=0.18$ for the 64 QAM operational mode, and $\alpha=0.12$ for the 256 QAM operational mode). The complexity of the digital signal processing portion of such a ZEB modulation communication system, according to the invention, is relatively modest in view of the performance improvements that it provides.

When implementing such a ZEB modulation communication system, the designer must ensure that the transmit filter and the receive filter are designed with sufficiently steep roll offs near the band edges of the available band (and ensuring spectral nulls at those band edges as well). Even when a design of such a ZEB modulation communication system is implemented using SQRC transmit and receive filters (as is sometimes done in many prior art zero ISI baseline communication systems), the description herein has shown that a performance improvement may nevertheless be realized. The difference in such a ZEB modulation communication system employing SQRC transmit and receive filters (compared to a zero ISI baseline communication systems employing SQRC transmit and receive filters) is that the ZEB modulation communication system operates using a modulation rate that occupies an entirety of spectra of an available band. In the case where this is a communication channel's bandwidth (W), the ZEB modulation communication system operates using the modulation rate of $1/T_W=W$, whereas the zero ISI baseline communication system operates using the modulation rate of $1/T=W/(1+\alpha)$. In this case, a rate improvement of 0.8 bit (or 2.4 dB) is found for a spectral roll off factor of $\alpha=0.25$. Although such a rate improvement in this embodiment is less than the 1.5 bit (or 4.5 dB) rate increase that is realized when in a ZEB modulation communication system with IIR response $h_\rho(D)=(1+D)/(1+\rho D)$, $\rho=0.9$ that does not use SQRC transmit and receive filters, the rate increase is still well worth pursuing.

It is also noted that adaptive equalization is sometimes needed in communication systems for high spectral efficiencies (e.g., >4 bits/symbol), even for well defined communication channels. Front end filters are sometimes not easily realized with sufficient precision. In the event that there is no excess bandwidth and the signal spectrum rolls off to zero at the band edges of the available band, then adaptive equalization may be achieved by a symbol spaced equalizer for arbitrary sampling phases of the received signal. This may be viewed as yet another of the benefits provided by the invention.

In view of the above detailed description of the invention and associated drawings, other modifications and variations will now become apparent. It should also be apparent that such other modifications and variations may be effected without departing from the spirit and scope of the invention.

What is claimed is:

1. A zero excess bandwidth modulation method, the method comprising:

encoding a plurality of information bits, thereby generating a plurality of encoded bits;

puncturing at least one of the plurality of encoded bits so that a plurality of remaining encoded bits includes a first encoded bit followed by a second encoded bit;

after performing the puncturing, rearranging an order of the plurality of remaining encoded bits so that the first encoded bit follows the second encoded bit, thereby generating a sequence of discrete-valued modulation symbols;

TH (Tomlinson-Harashima) precoding of the sequence of discrete-valued modulation symbols according to a predetermined overall channel symbol response having spectral zeroes at edges of a corresponding Nyquist band, thereby generating a plurality of discrete-time transmit signals at a modulation rate;

inserting the plurality of discrete-time transmit signals into means to generate a continuous-time transmit signal by appropriate discrete-time filtering, digital-to-analog conversion (DAC), and continuous-time filtering;

ensuring, within the means to generate the continuous-time transmit signal, that the continuous-time transmit signal has spectral zeroes at the edges of the corresponding Nyquist band, which equals a bandwidth of the available transmission band, and that any spectral components outside of the available transmission band are substantially suppressed; and launching the filtered, continuous-time transmit signal into the communication channel.

2. The method of claim 1, wherein:

the predetermined overall channel response is characterized as $h(D)=1+h_1D+h_2D^2+\ldots$;

$D=e^{-j2\pi fT}(=z^{-1}$;

f is frequency;

T is an inverse of the bandwidth of the available transmission band;

$h_1, h_2, \ldots$ are constant valued coefficients; and $h(D)$ is zero when $D=-1$.

3. The method of claim 1, further comprising:

mapping the rearranged plurality of remaining encoded bits into a plurality of modulation symbols according to a symbol constellation and a corresponding mapping function, thereby generating the sequence of discrete-valued modulation symbols.

4. The method of claim 1, further comprising:

encoding a subset of information bits of the plurality of information bits into the plurality of encoded bits; and mapping the rearranged plurality of remaining encoded bits and at least one uncoded information bits into a plurality of modulation symbols according to a symbol constellation and a corresponding mapping function, thereby generating the sequence of discrete-valued modulation symbols.

5. The method of claim 1, wherein:

TH precoding operates on the discrete-valued modulation symbols to perform an inverse filtering operation in accordance with the predetermined overall channel symbol response and executes modulo operations to limit signals within a predetermined signal region, thereby generating the plurality of discrete-time transmit signals at the modulation rate.

6. The method of claim 1, wherein:

the sequence of discrete-valued modulation symbols has a modulation type of at least one of PAM (pulse amplitude modulation), QPSK (quadrature phase shift keying), 16 QAM (quadrature amplitude modulation), and a higher-order QAM.

7. The method of claim 1, wherein:

the encoding of the plurality of information bits thereby generating the sequence of discrete-valued modulation symbols involves at least one of uncoded modulation, TCM (trellis coded modulation), TTCM (turbo trellis coded modulation), LDPC (low density parity check) encoding and modulation, and concatenated encoding and modulation.

8. The method of claim 1, wherein:

the method is performed cooperatively within a communication transmitter and a communication receiver that are communicatively coupled via the communication channel.

9. The method of claim 1, further comprising:

receiving a continuous-time receive signal from the communication channel;

converting the continuous-time receive signal into a discrete-time signal by means to perform appropriate continuous-time filtering, ADC (analog-to-digital conversion), and discrete-time filtering, thereby obtaining a plurality of discrete-time receive signals at the modulation rate;

ensuring, within the means to perform appropriate continuous-time filtering, ADC, and discrete-time filtering, that any signal and noise components outside of the available transmission band is suppressed and that the discrete-time receive signal is shaped into a form corresponding to the predetermined overall channel symbol response that is assumed for the TH precoding, and decoding the plurality of discrete-time receive signals to generate best estimates of the sequence of discrete-valued modulation symbols and the information bits encoded therein.

10. The method of claim 9, further comprising:

performing adaptive equalization when ensuring that the discrete-time receive signal is shaped into a form corresponding to the predetermined overall channel symbol response that is assumed for the TH precoding.

11. The method of claim 1, wherein:

the predetermined overall channel symbol response employed for TH precoding, referred to as h(D), is a finite impulse response (FIR) $h(D)=1+h_1D+h_2D+\ldots h_LD^L$ for some finite positive integer L, or an infinite impulse response (IIR) $h(D)=p(D)/q(D)$; and $p(D)=1+p_1D+h_PD^P$ and $q(D)=1+q_1D+\ldots q_QD^Q$ for some finite positive integers P and Q.

12. The method of claim 11, wherein:

$h(D)=(1+D)/(1-\rho D)$ for $0<<\rho<1$.

13. The method of claim 1, further comprising:

after rearranging the order of the plurality of remaining encoded bits, puncturing at least one of the rearranged plurality of remaining encoded bits.

14. The method of claim 1, wherein:

the sequence of discrete-valued modulation symbols has a modulation type of 32 QAM (quadrature amplitude modulation) (double square).

15. A zero excess bandwidth modulation communication transmitter, the transmitter comprising:

an encoder and symbol mapper that:

encodes a plurality of information bits, thereby generating a plurality of encoded bits;

performs puncturing at least one of the plurality of encoded bits so that a plurality of remaining encoded bits includes a first encoded bit followed by a second encoded bit; and after performing the puncturing, rearranges an order of the plurality of remaining encoded bits so that the first encoded bit follows the second encoded bit, thereby generating a sequence of discrete-valued modulation symbols;

a TH (Tomlinson-Harashima) precoder that performs precoding of the sequence of discrete-valued modulation symbols according to a predetermined overall channel symbol response having spectral zeroes at edges of a corresponding Nyquist band, thereby generating a plurality of discrete-time transmit signals at a modulation rate;

means to generate a continuous-time transmit signal by appropriate discrete-time filtering, digital-to-analog conversion (DAC), and continuous-time filtering;

wherein the plurality of discrete-time transmit signals is inserted into the means; wherein the means ensures that the continuous-time transmit signal has spectral zeroes at the edges of the corresponding Nyquist band, which equals a bandwidth of the available transmission band, and that any spectral components outside of the available transmission band are substantially suppressed; and wherein the filtered, continuous-time transmit signal is launched into the communication channel from the transmit filter.

16. The transmitter of claim 15, wherein:

the predetermined overall channel response is characterized as $h(D)=1+h_1D+h_2D^2+\ldots$;

$D=e^{-j2\pi fT}(=z^{-1})$;

f is frequency;

T is an inverse of the bandwidth of the available transmission band;

$h_1, h_2, \ldots$ are constant valued coefficients; and $h(D)$ is zero when $D=-1$.

17. The transmitter of claim 15, wherein:

the encoder and symbol mapper maps the rearranged plurality of remaining encoded bits into a plurality of modulation symbols according to a symbol constellation and a corresponding mapping function, thereby generating the sequence of discrete-valued modulation symbols.

18. The transmitter of claim 15, wherein:

the encoder and symbol mapper encodes a subset of information bits of the plurality of information bits into the plurality of encoded bits; and the encoder and symbol mapper maps the rearranged plurality of remaining encoded bits and at least one uncoded information bits into a plurality of modulation symbols according to a symbol constellation and a corresponding mapping function, thereby generating the sequence of discrete-valued modulation symbols.

19. The transmitter of claim 15, wherein:

the TH precoder operates on the discrete-valued modulation symbols to perform an inverse filtering operation in accordance with the predetermined overall channel symbol response and executes modulo operations to limit signals within a predetermined signal region, thereby generating the plurality of discrete-time transmit signals at the modulation rate.

20. The transmitter of claim 15, wherein:

the sequence of discrete-valued modulation symbols has a modulation type of at least one of PAM (pulse amplitude modulation), QPSK (quadrature phase shift keying), 16 QAM (quadrature amplitude modulation), and a higher-order QAM.

21. The transmitter of claim 15, wherein:

the encoder and symbol mapper performs encoding of the plurality of information bits, thereby generating the sequence of discrete-valued modulation symbols, that involves at least one of uncoded modulation, TCM (trellis coded modulation), TTCM (turbo trellis coded modulation), LDPC (low density parity check) encoding and modulation, and concatenated encoding and modulation.

22. The transmitter of claim 15, wherein:

the communication transmitter is communicatively coupled to a communication receiver via the communication channel; and the communication transmitter, the communication receiver, and the communication channel form a communication system.

23. The communication system of claim 22, wherein:

the communication receiver receives a continuous-time receive signal from the communication channel;

the communication receiver converts the continuous-time receive signal into a discrete-time signal using means to perform appropriate continuous-time filtering, ADC (analog-to-digital conversion), and discrete-time filtering, thereby obtaining a plurality of discrete-time receive signals at the modulation rate;

the communication receiver ensures, within the means to perform appropriate continuous-time filtering, ADC, and discrete-time filtering, that any signal and noise components outside of the available transmission band is suppressed and that the discrete-time receive signal is shaped into a form corresponding to the predetermined overall channel symbol response that is assumed for the TH precoding, and the communication receiver performs decoding of the plurality of discrete-time receive signals to generate best estimates of the sequence of discrete-valued modulation symbols and the information bits encoded therein.

24. The communication system of claim 23, wherein:

the communication receiver performs adaptive equalization when ensuring that the discrete-time receive signal is shaped into a form corresponding to the predetermined overall channel symbol response that is assumed for the TH precoding.

25. The transmitter of claim 15, wherein:

the predetermined overall channel symbol response employed by the TH precoder, referred to as $h(D)$, is a finite impulse response (FIR) $h(D)=1+h_1D+h_2D+h_LD^L$ for some finite positive integer L, or an infinite impulse response (IIR) $h(D)=p(D)/q(D)$; and $p(D)=1+p_1D+\ldots h_PD^P$ and $q(D)=1+q_1D+\ldots q_QD^Q$ for some finite positive integers P and Q.

26. The transmitter of claim 25, wherein:

for $0<<\rho<1$.

27. The transmitter of claim 13, wherein:

after rearranging the order of the plurality of remaining encoded bits, the encoder and symbol mapper punctures at least one of the rearranged plurality of remaining encoded bits.

28. The transmitter of claim 15, wherein:

the sequence of discrete-valued modulation symbols has a modulation type of 32 QAM (quadrature amplitude modulation) (double square).

* * * * *

UNITED STATES PATENT AND TRADEMARK OFFICE
CERTIFICATE OF CORRECTION

PATENT NO. : 7,616,701 B2
APPLICATION NO. : 10/779825
DATED : November 10, 2009
INVENTOR(S) : Gottfried Ungerboeck It is certified that error appears in the above-identified patent and that said Letters Patent is hereby corrected as shown below:

Column 21, line 15, in Claim 2: insert --)-- before ";".

Column 23, line 9, in Claim 16: insert --)-- before ";".

Signed and Sealed this

Second Day of February, 2010

David J. Kappos
*Director of the United States Patent and Trademark Office*